(12) United States Patent
Han

(10) Patent No.: US 10,841,450 B2
(45) Date of Patent: Nov. 17, 2020

(54) IMAGE FORMING APPARATUS ACQUIRING APPLICATION PROCESSING INFORMATION AT A DETERMINED PROCESSING TIME

(71) Applicant: Xiaofeng Han, Kanagawa (JP)

(72) Inventor: Xiaofeng Han, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 16/407,702

(22) Filed: May 9, 2019

(65) Prior Publication Data

US 2019/0373130 A1 Dec. 5, 2019

(30) Foreign Application Priority Data

May 31, 2018 (JP) .................... 2018-105650

(51) Int. Cl.
*H04N 1/00* (2006.01)
*G06F 8/61* (2018.01)

(52) U.S. Cl.
CPC .......... *H04N 1/00973* (2013.01); *G06F 8/62* (2013.01); *H04N 1/00896* (2013.01); *H04N 1/00938* (2013.01)

(58) Field of Classification Search
None
See application file for complete search history.

(56) References Cited

U.S. PATENT DOCUMENTS

| | | |
|---|---|---|
| 2011/0022377 A1 | 1/2011 | Han et al. |
| 2013/0139142 A1 | 5/2013 | Ikawa et al. |
| 2013/0145141 A1 | 6/2013 | Han et al. |
| 2013/0174141 A1 | 7/2013 | Hirokawa et al. |
| 2013/0174270 A1 | 7/2013 | Sugiura et al. |
| 2013/0219261 A1 | 8/2013 | Han et al. |
| 2014/0281914 A1 | 9/2014 | Sakawaki et al. |
| 2014/0380502 A1 | 12/2014 | Sugiura et al. |
| 2015/0057990 A1 | 2/2015 | Han et al. |
| 2015/0220323 A1 | 8/2015 | Ikawa et al. |
| 2015/0309996 A1 | 10/2015 | Han |
| 2016/0337536 A1 | 11/2016 | Han |
| 2016/0337544 A1 | 11/2016 | Han |
| 2017/0078293 A1 | 3/2017 | Han |
| 2017/0255763 A1 | 9/2017 | Han |
| 2017/0272597 A1 | 9/2017 | Han |
| 2018/0302525 A1 | 10/2018 | Han |
| 2018/0341434 A1 | 11/2018 | Han |

FOREIGN PATENT DOCUMENTS

| | | |
|---|---|---|
| JP | 2013-218742 | 10/2013 |
| JP | 2017-129966 | 7/2017 |

OTHER PUBLICATIONS

U.S. Appl. No. 16/153,867, filed Oct. 8, 2018, Xiaofeng Han.

*Primary Examiner* — Lennin R Rodriguezgonzalez
(74) *Attorney, Agent, or Firm* — Oblon, McClelland, Maier & Neustadt, L.L.P.

(57) ABSTRACT

An image forming apparatus, information processing system, and information processing method are provided. The image forming apparatus is communicably connected to a server and acquires application processing information which has been reserved in the server in advance, indicating an application from among one or more applications that are installed or not installed on the image forming apparatus and which are determined to require application processing and controls the application processing of the application indicated by the application processing information acquired from the server.

9 Claims, 32 Drawing Sheets

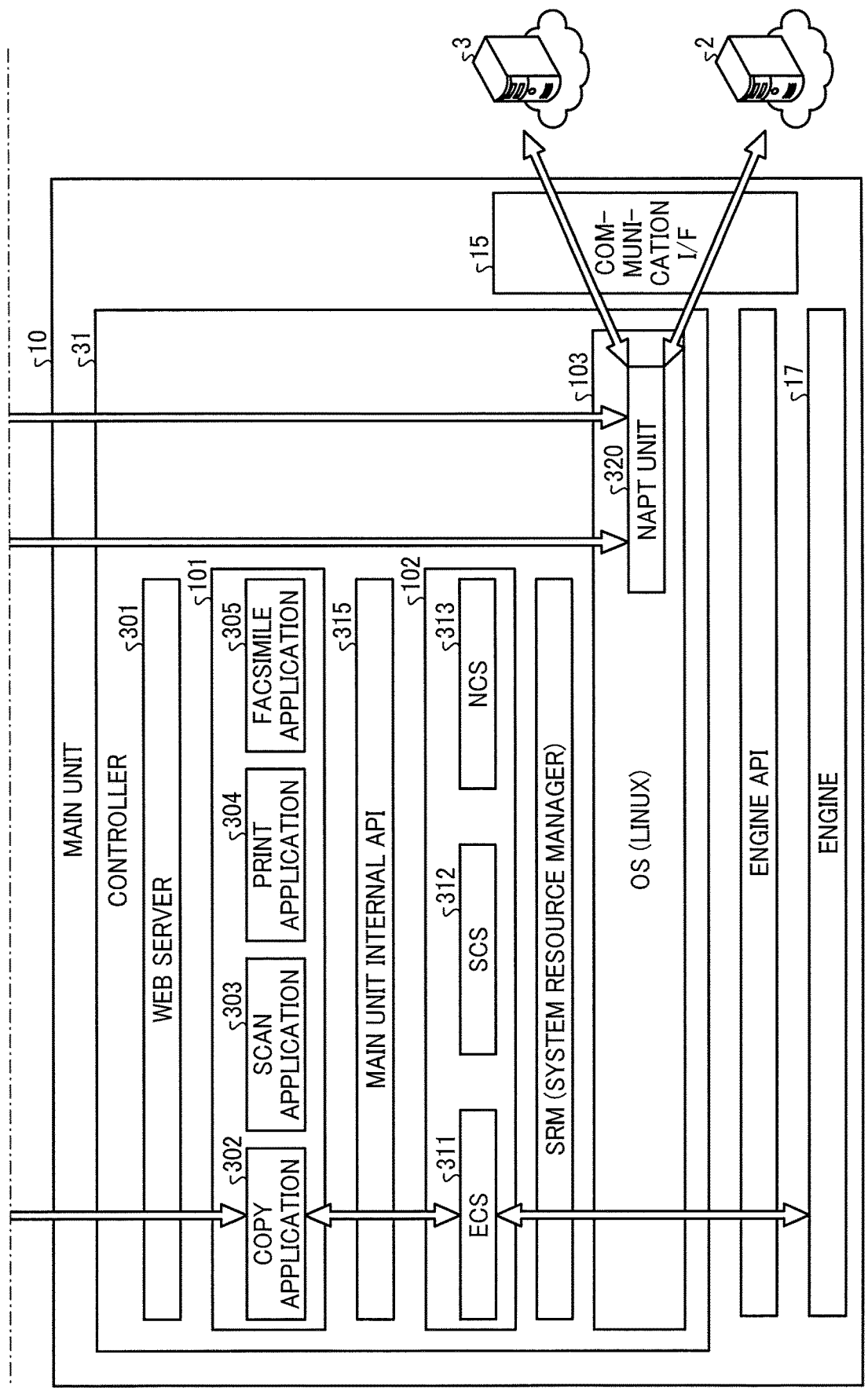

Installer://installApp?id=49354

FIG. 13

| PRODUCT ID | MODULE ID | MINIMUM VERSION |
|---|---|---|
| xxx1 | yyy1 | z.01 |
| xxx2 | yyy2 | z.02 |
| xxx3 | yyy3 | z.03 |
| ⋮ | ⋮ | ⋮ |

FIG. 32

DEVICE LIST

DEVICE IDENTIFICATION NUMBER: [XXX]  [SEARCH]

| DEVICE IDENTIFICATION NUMBER | MODEL NAME |
|---|---|
| XXX00000000 | joint-test-exp |
| XXX00000001 | joint-test-exp |
| XXXX-000001 | joint-test-dom |
| XXXX-000002 | joint-test-dom |
| XXXX-000003 | joint-test-dom |

[BACK]

FIG. 33

SUPPORTED APPLICATION LIST [XXX00000000(joint-test-exp)]

APPLICATION STATE: ☐ NOT INSTALLED  ☐ INSTALLATION RESERVED
☐ INSTALLED  ☐ UNINSTALLATION RESERVED
☐ UNINSTALLED  ☐ NOT UPDATED
☐ UPDATE RESERVED

[REGISTER]

| APPLICATION NAME | VERSION | APPLICATION STATE ▲ | PROCESSING RESERVATION |
|---|---|---|---|
| Joint Test | 1.0.0 | INSTALLATION RESERVED | ☐ CANCEL INSTALLATION RESERVATION |
| test | 1.0 | NOT INSTALLED | ☐ RESERVE INSTALLATION |

[BACK]

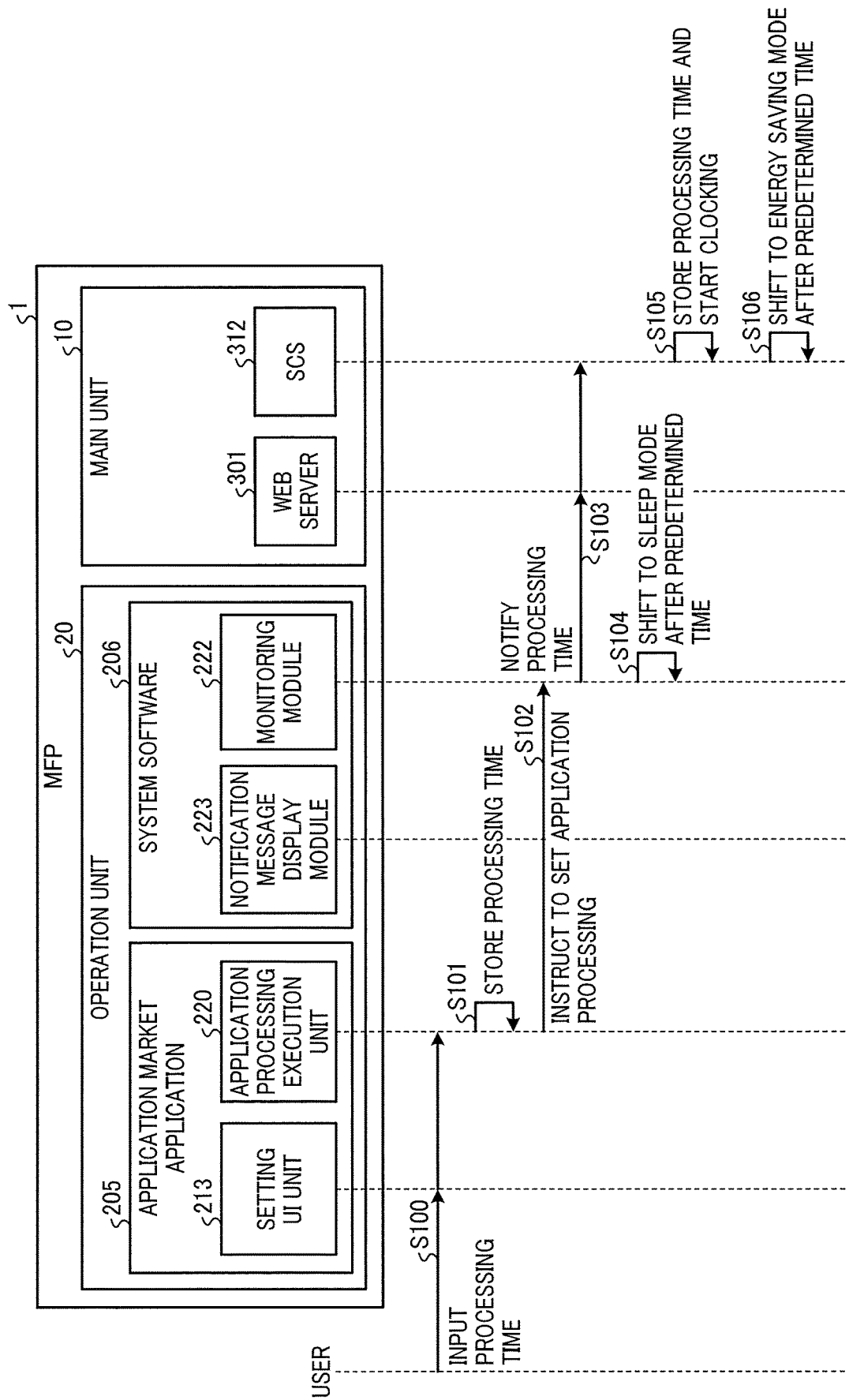

ical Field

The present disclosure relates to an image forming apparatus, an information processing system, and an information processing method.

Background Art

Conventionally, a multifunction peripheral (MFP) which is one example of an image forming apparatus, is equipped with a mechanism to download from a web page and install an application. Processing relating to an application, such as installation, updating, or uninstallation of the application (hereinafter, may be referred to as application processing) on the image forming apparatus, must be done manually, by input operation.

SUMMARY

Embodiments of the present disclosure describe an improved image forming apparatus, information processing system, and information processing method. The image forming apparatus is communicably connected to a server and acquires application processing information which has been reserved in the server in advance, indicating an application from among one or more applications that are installed or not installed on the image forming apparatus and which are determined to require application processing and controls the application processing of the application indicated by the application processing information acquired from the server.

BRIEF DESCRIPTION OF THE DRAWINGS

A more complete appreciation of the embodiments and many of the attendant advantages and features thereof can be readily obtained and understood from the following detailed description with reference to the accompanying drawings, wherein:

FIG. 5A and FIG. 5B are block diagrams illustrating a software configuration of a main unit and an operation unit;

FIG. 13 is a diagram illustrating an example of an update prohibition setting screen;

FIG. 32 is a diagram illustrating an example of a device list screen;

FIG. 33 is a diagram illustrating an example of a supported application list screen;

FIG. 34 is a sequence diagram illustrating an example of operation by the MFP in response to an input of a processing time;

Figure 1:
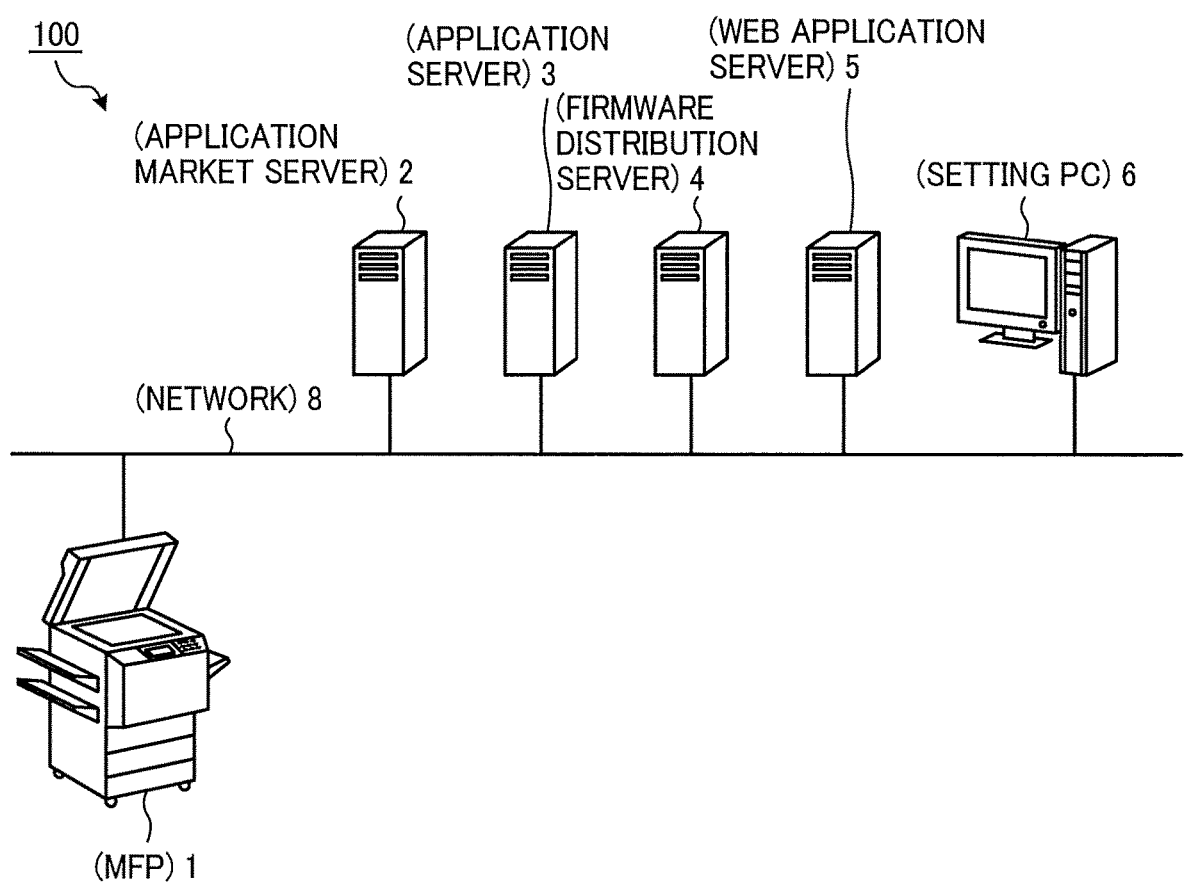
FIG. 1 is a diagram illustrating an example of a configuration of an information processing system.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Hereinafter, a description is given of several embodiments of an image forming apparatus, an information processing system, and an information processing method with reference to the attached drawings. Hereinafter, an MFP is described as an example of the image forming apparatus according to the present disclosure, but the present disclosure is not limited to the example. Note that the MFP is a device having a plurality of different functions such as a copy function, a scan function, a print function, and a facsimile function.

First Embodiment (Configuration of Information Processing System)

Figure 2:
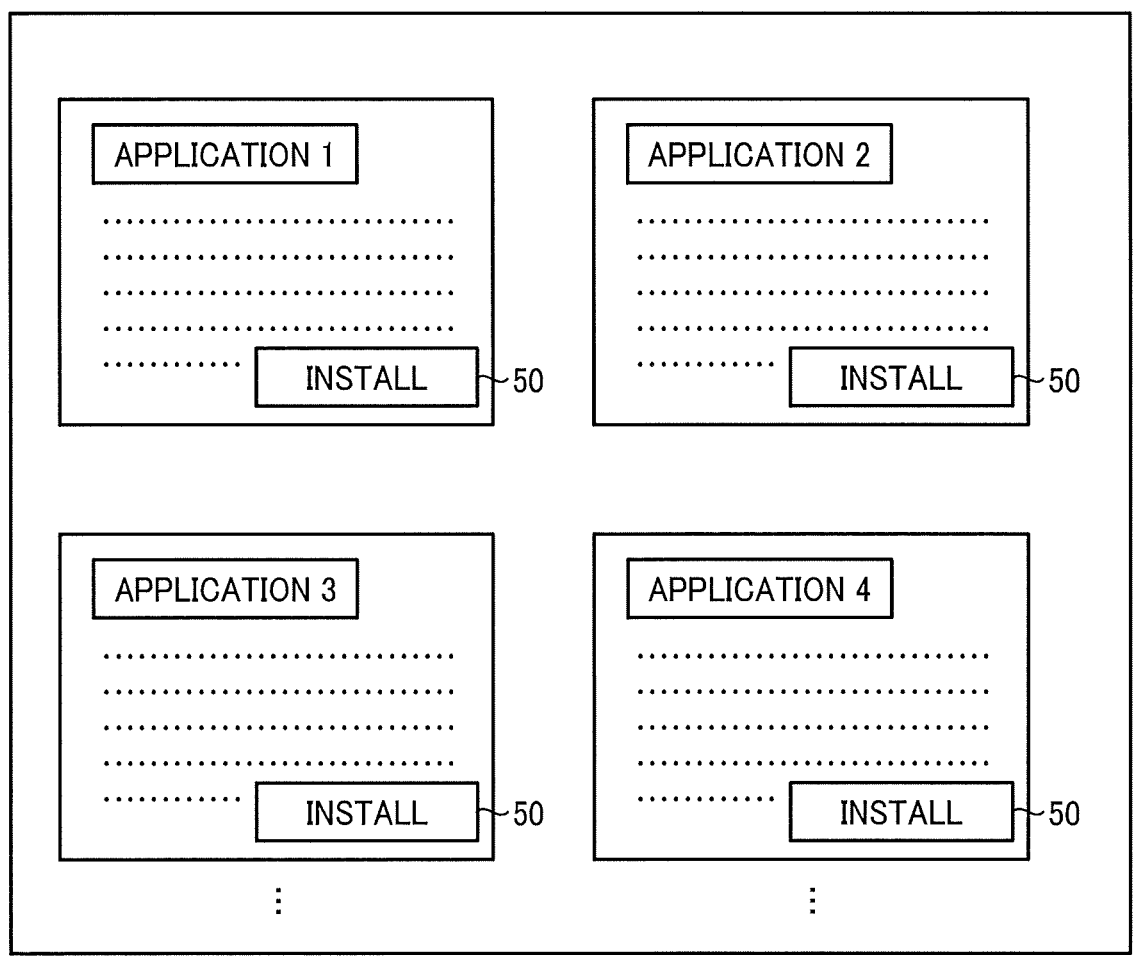
FIG. 2 is a diagram illustrating an example of an application list screen (web page)

FIG. 1 is a diagram illustrating an example of a configuration of an information processing system. FIG. 2 is a diagram illustrating an example of an application list screen (web page). The configuration of the information processing system 100 is described with reference to FIGS. 1 and 2.

As illustrated in FIG. 1, the information processing system 100 includes the MFP 1, an application market server 2, an application server 3, a firmware distribution server 4, a web application server 5, and a setting PC 6, interconnected through a network 8.

The application market server 2 provides the MFP 1 with an application list screen in which an installation instruction, which is an example of an instruction to install the application to the MFP 1, is associated with each of a plurality of applications. In the example of FIG. 2, on the application list screen, description information for explaining the content of the application and an installation button 50 for instructing installation of the application are displayed for each of the plurality of applications. When a user presses the installation button 50 of the desired application in the application list screen displayed on the MFP 1, the application is downloaded and installed in the MFP 1. The specific content of the MFP 1 is described below. Although it is possible to install the application manually by the operation on the application list screen as described above, in the present embodiment, processing (application processing) such as installation of an application can be automatically performed. Details of the application processing are described below.

The application server 3 stores the application displayed on the application list screen and delivers the application in response to a request from the MFP 1. The application stored in the application server 3 is a native application. In addition, the application server 3 determines whether or not the application presented from the MFP 1 can be used in the MFP 1 (details are described below).

The firmware distribution server 4 distributes firmware for controlling the operation of the MFP 1 in response to a request from the MFP 1. More specific contents are described below.

The web application server 5 stores contents of a web application displayed on the application list screen or the like and distributes the contents in response to the execution request of the web application from the MFP 1.

The setting PC 6 is an information processing apparatus for performing reservation setting of application processing for installing, updating, uninstalling applications, and the like for an electronic device such as the MFP 1.

(Hardware Configuration of MFP)

A hardware configuration of the MFP 1 is described with reference to FIG. 3.

Figure 3:
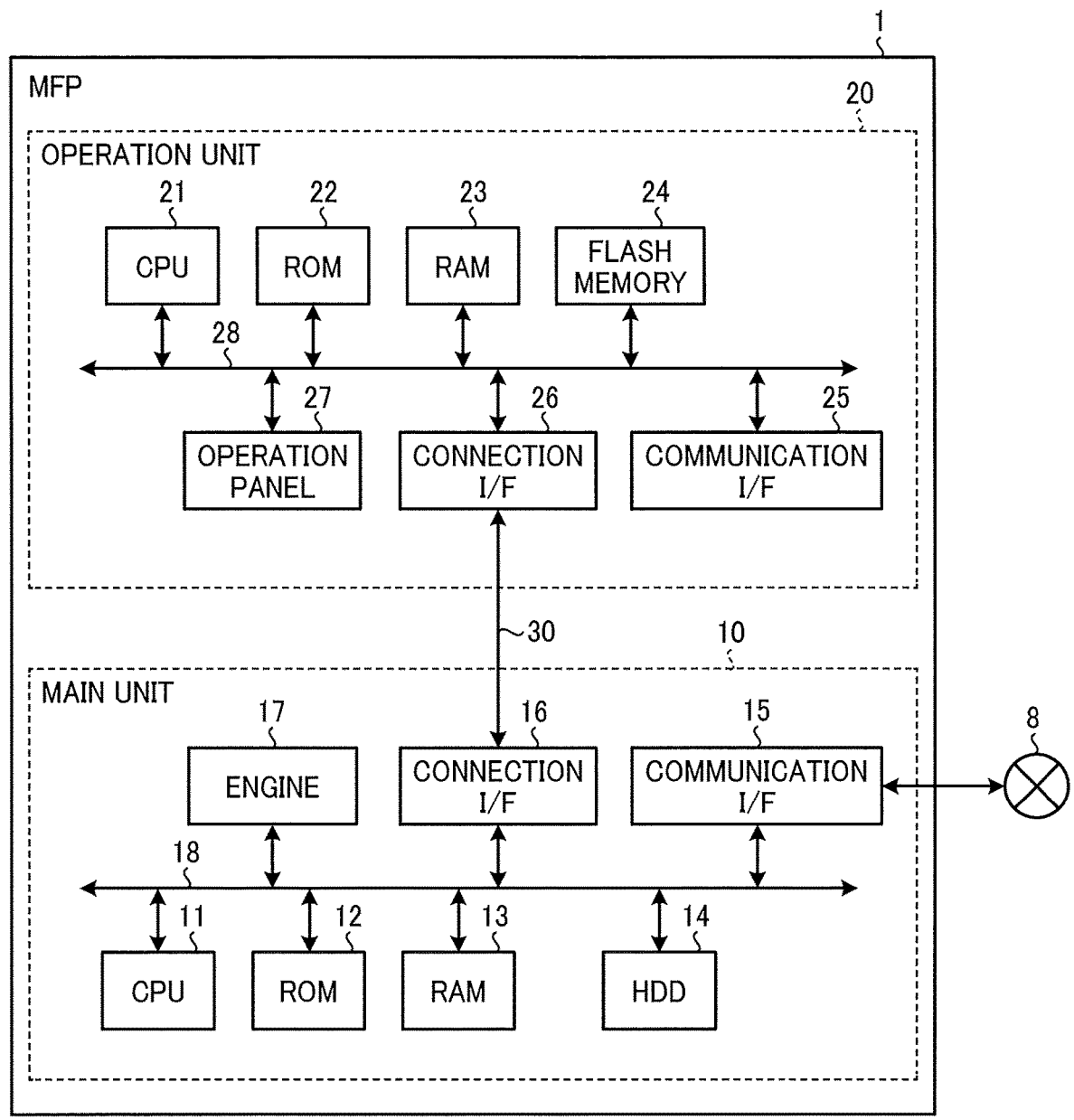
FIG. 3 is a block diagram illustrating an example of a hardware configuration of a multifunction peripheral (MFP)

As illustrated in FIG. 3, the MFP 1 includes a main unit 10 capable of implementing various functions such as a copier function, a scanner function, a facsimile function, a printer function, and the like, and an operation unit 20 that receives a user operation. Reception of an operation by a user includes accepting information (including a signal indicating coordinates on a screen or the like) input according to an operation of a user. Here, the operation unit 20 is also a device for instructing the main unit 10 to execute an operation. The main unit 10 and the operation unit 20 are connected to each other so as to be able to communicate with each other through a dedicated communication path 30. For example, a Universal Serial Bus (USB) standard can be used for the communication path 30, but any wired or wireless communication standard can also be used.

The main unit 10 executes an operation corresponding to the operation accepted by the operation unit 20. Further, the main unit 10 is also capable of communicating with an external device such as a client PC and can also execute an operation according to an instruction received from the external device. The main unit 10 at least includes an image forming section for forming an image on a recording medium, for example, paper. The detailed configuration of the main unit 10 is described below.

First, a hardware configuration of the main unit 10 is described. As illustrated in FIG. 3, the main unit 10 includes a central processing unit (CPU) 11, a read only memory (ROM) 12, a random access memory (RAM) 13, a hard disk drive (HDD) 14, a communication interface (I/F) 15, a connection I/F 16, and an engine 17, which are connected with one another through a system bus 18.

The CPU 11 controls overall operation of the main unit 10. The CPU 11 controls the overall operation of the main unit 10 by executing programs stored in the ROM 12, the HDD 14, and the like using the RAM 13 as a work area to implement various functions such as the copy function, the scan function, the facsimile function and the print function as described above.

The communication I/F 15 is an interface for connecting the main unit 10 to the network 8. The connection I/F 16 is an interface for enabling the main unit 10 to communicate with the operation unit 20 through the communication path 30.

The engine 17 is hardware that performs processing other than general purpose information processing and communication to implement the copy function, the scan function, the facsimile function, and the print function. The engine 17 includes, for example, a scanner (image reading unit) that scans a document into an image, a plotter (image forming unit) that performs printing on sheet materials such as a sheet of paper, and a facsimile unit that performs facsimile communication. The MFP 1 may further include optional equipment such as a finisher that sorts the printed sheets, and an automatic document feeder (ADF) that automatically feeds documents to be scanned. In the present embodiment, it is assumed that the main unit 10 at least includes a printer or a scanner.

Next, a description is given of a hardware configuration of the operation unit 20 hereinafter. As illustrated in FIG. 3, the operation unit 20 includes a CPU 21, a ROM 22, a RAM 23, a flash memory 24, a communication I/F 25, a connection I/F 26, and an operation panel 27, which are connected with one another through a system bus 28.

The CPU 21 controls overall operation of the operation unit 20. The CPU 21 executes programs stored in the ROM 22, the flash memory 24, and the like, using the RAM 23 as a work area, to implement various functions described below, such as displaying information or images in response to an input from the user.

The communication I/F 25 is an interface for connecting the operation unit 20 to the network 8. The connection I/F 26 is an interface for enabling the operation unit 20 to communicate with the main unit 10 through the communication path 30. The operation panel 27 receives various inputs in response to a user operation and displays various information, such as information corresponding to the received operation, information indicating an operational status of the MFP 1, and information indicating a setting status. In this example, the operation panel 27 is implemented by a liquid crystal display (LCD) that is a touch panel, however, such an LCD is just an example. In another example, the operation panel 27 may be implemented by an organic electroluminescence (EL) display having a touch panel function. In alternative to or in addition to the LCD or the EL display, the operation panel 27 may include an operation unit such as hardware keys or a display unit such as an indicator lamp.

(Software Configuration of MFP)

A software configuration of the MFP 1 is described with reference to FIG. 4.

Figure 4:
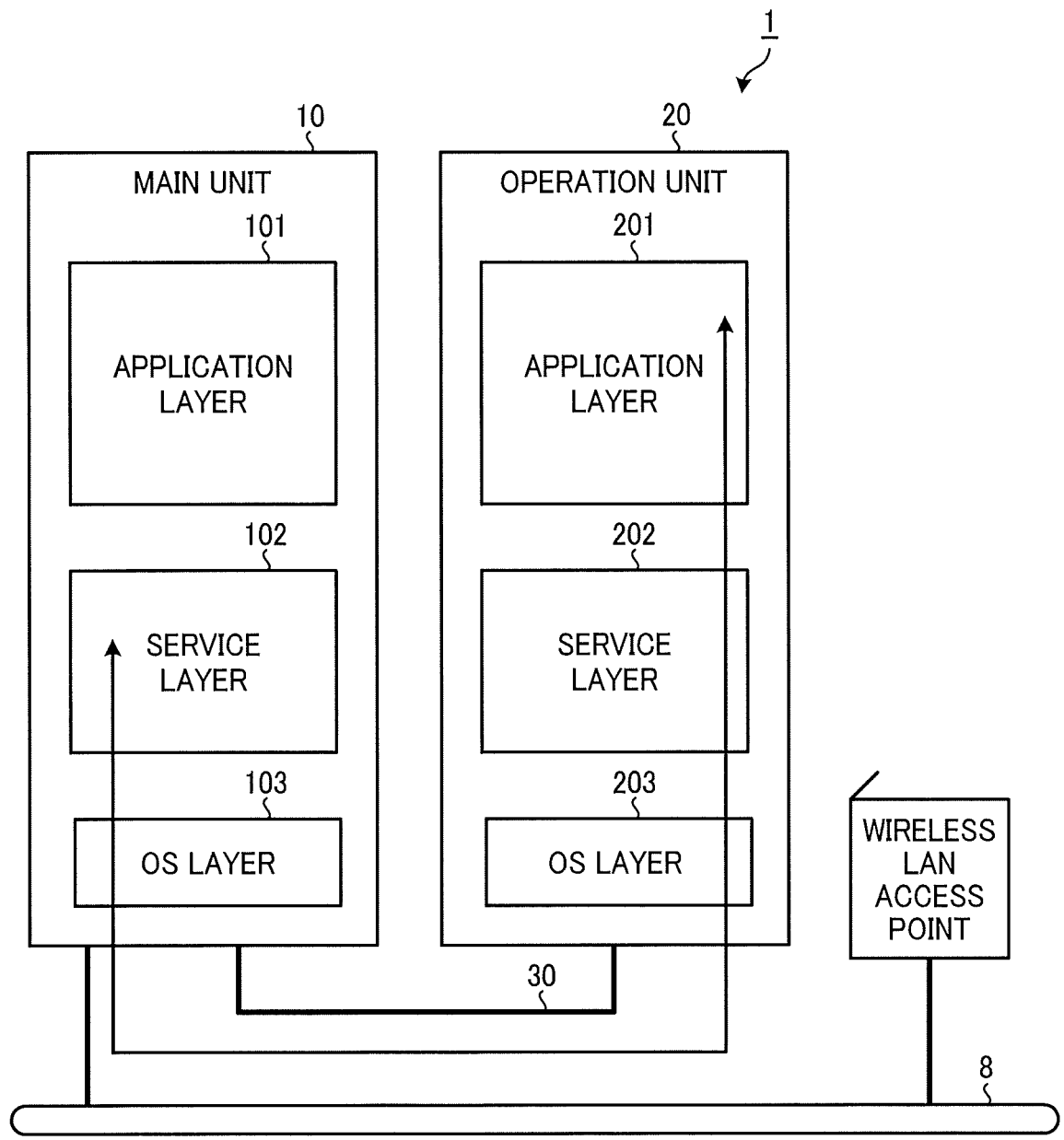
FIG. 4 is a block diagram illustrating an example of a software configuration of the MFP.

As illustrated in FIG. 4, the main unit 10 includes an application layer 101, a service layer 102, and an operating system (OS) layer 103. The entities of the application layer 101, the service layer 102, and the OS layer 103 are various types of software stored in the ROM 12 or the HDD 14. The CPU 11 executes various types of software to provide various functions.

The software of the application layer 101 is application software that causes hardware resources to operate to provide specific functions. The "application software" may be referred to as simply an "application" hereinafter. Examples of the application include a copy application that provides the copy function, a scan application that provides the scan function, a facsimile application that provides the facsimile function, and a print application that provides the print function.

The software of the service layer 102, which intervenes between the application layer 101 and the OS layer 103, provides the application with an interface for using the hardware resources of the main unit 10. More specifically, the software for the service layer 102 provides the functions of receiving the operation requests to the hardware resources and mediating the operation requests. Examples of the operation requests that the service layer 102 receives may include a request for scanning by the scanner and a request for printing by the plotter.

The interface function by the service layer 102 may be provided also to the application layer 201 of the operation unit 20 as well as to the application layer 101 of the main unit 10. In other words, the application layer 201 (application) of the operation unit 20 is also capable of implementing functions that use the hardware resources such as the engine 17 of the main unit 10 through the interface function of the service layer 102. For example, the interface function of the service layer 102 is provided by web application programming interface (API).

The software of the OS layer 103 is basic operating software (OS) that provides the basic functions of controlling the hardware that the main unit 10 includes. The software of the service layer 102 converts each of the requests received from various applications for using the hardware resources, to a command that is interpretable by the OS layer 103. The software of the service layer 102 passes the command to the OS layer 103. The software of the OS layer 103 executes the command to enable the hardware resources to operate in accordance with the request by the application.

The operation unit 20 similarly includes the application layer 201, a service layer 202 and an OS layer 203. The application layer 201, the service layer 202 and the OS layer 203 of the operation unit 20 have a similar layer structure as those of the main unit 10. However, functions provided by application of the application layer 201 and operation requests to be received by the service layer 202 are different from those of the main unit 10.

The application of the application layer 201 may be software for causing the hardware resources of the operation unit 20 to operate so as to provide predetermined functions. In the meantime, the application of the application layer 201 is mainly software for providing the user interface (UI) function for operating or displaying functions that the main unit 10 includes, such as the copy function, the scan function, the facsimile function and the print function. In this example, the application of the application layer 201 also includes an application market application that provides a function of acquiring an application list screen. The software of the service layer 202 is system software for supporting the operation of the computer, such as managing and controlling the hardware of the computer. The software (system software) of the service layer 202 includes an installer and the like for installing the application and updating the firmware.

In the present embodiment, the software of the OS layer 103 that the main unit 10 includes and the software of the OS layer 203 that the operation unit 20 includes are different from each other in order to maintain the independency of functions. In other words, the main unit 10 and the operation unit 20 operate independently of each other on separate operating systems. For example, Linux (registered trademark) may be used as the software for the OS layer 103 of the main unit 10, whereas Android (registered trademark) may be used as the software for the OS layer 203 of the operation unit 20.

As described above, in the MFP 1 according to the present embodiment, the main unit 10 and the operation unit 20 respectively operate on separate operating systems. Accordingly, communication between the main unit 10 and the operation unit 20 is performed as communication between separate apparatuses instead of interprocess communication within a common apparatus. Examples of the communication between the main unit 10 and the operation unit 20 may include command communication, which is an operation of transmitting information (e.g., instruction contents from a user) received by the operation unit 20 to the main unit 10. Examples of the communication between the main unit 10 and the operation unit 20 may further include an operation by the main unit 10 of notifying the operation unit 20 of an event. In this embodiment, the operation unit 20 communicates commands to the main unit 10 to use the functions of the main unit 10. Examples of the events notified from the main unit 10 to the operation unit 20 may include an operational state of the main unit 10 and contents of settings in the main unit 10.

In addition, in the present embodiment, power is supplied from the main unit 10 to the operation unit 20 through the communication path 30. Accordingly, the power control of the operation unit 20 may be performed separately (independently) from the power control of the main unit 10.

Figure 5A:
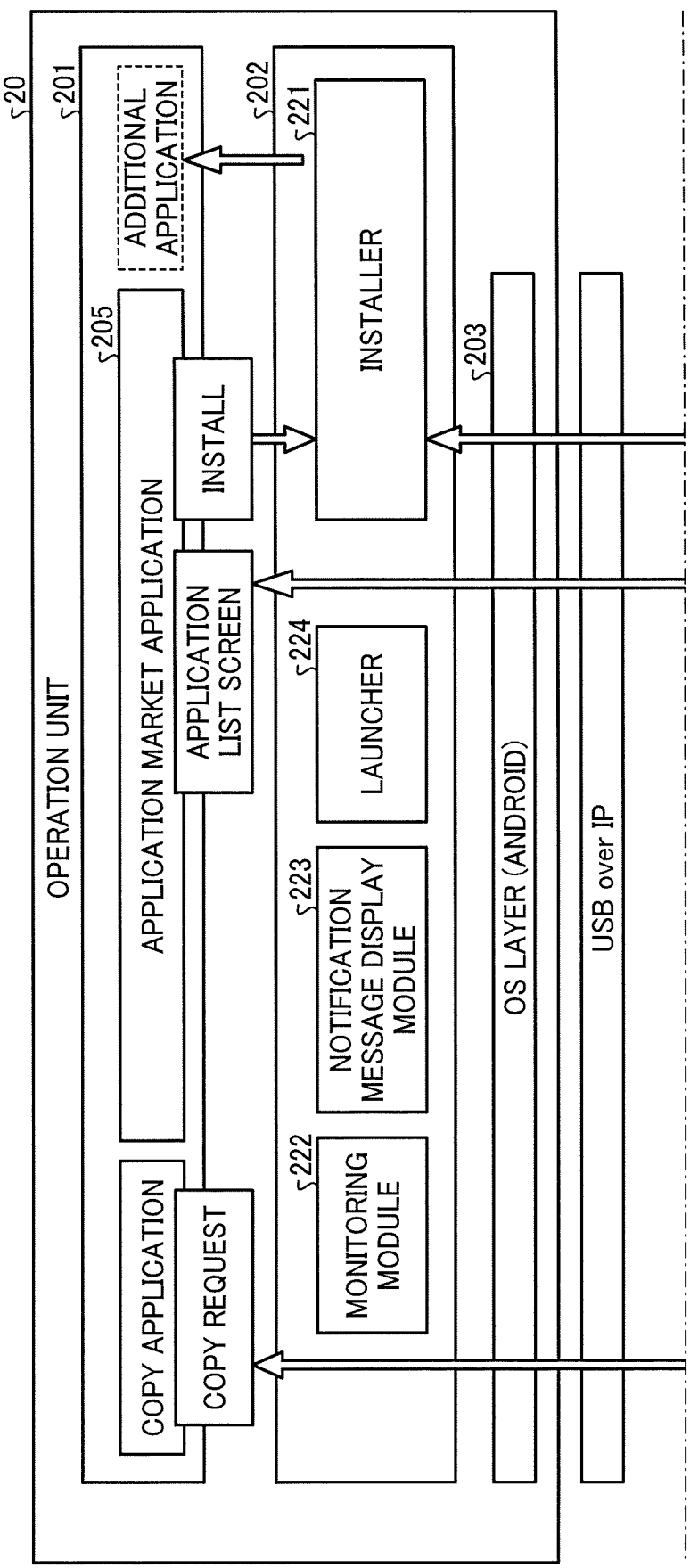

FIG. 5A and FIG. 5B are block diagrams illustrating a software configuration of the main unit and the operation unit. As illustrated in FIG. 5B, the main unit 10 includes a controller 31 on which the CPU 11 and the like are mounted, and the engine 17.

The controller 31 includes a web server 301, main unit applications (copy application 302, scan application 303, print application 304, facsimile application 305, etc.) of the application layer 101, system software (engine control service 311 (hereinafter referred to as "ECS 311"), a system control service 312 (hereinafter referred to as "SCS 312"), a network control service 313 (hereinafter referred to as "NCS 313", etc.) of the service layer 102, and the OS layer 103. These functions are provided by the CPU 11 executing various programs.

The web server 301 receives a request from the operation unit 20 or an external terminal, converts the request into information (request information) which can be interpreted by the main unit application, and distributes (dispatches) the request information to the corresponding main application. Upon receiving the request information from the web server 301, the main application causes the engine 17 to execute a process such as a job through each service by using the main unit internal API 315.

The ECS 311 is a service module that manages and arbitrates the engine 17. The SCS 312 is a service module for performing energy-saving control (details are described below) of the MFP 1, job management, and the like. The NCS 313 is a service module for performing communication control (network control) and the like.

For example, when the copy application 302 of the main unit 10 receives a copy request (based on a copy request from an application (copy application) of the operation unit 20) from the web server 301, the copy application 302 of the main unit 10 causes the engine 17 to execute a copy job through the ECS 311 using the main unit internal API 315.

Note that when using the SCS 312 of the main unit 10 from the application of the operation unit 20, a communication module between the operation unit 20 and the main unit 10 (a module of the controller 31 that serves as a bridge between the operation unit application and the SCS 312) is used and the API (the web server 301 and the main unit internal API 315) is not used.

Figure 6:
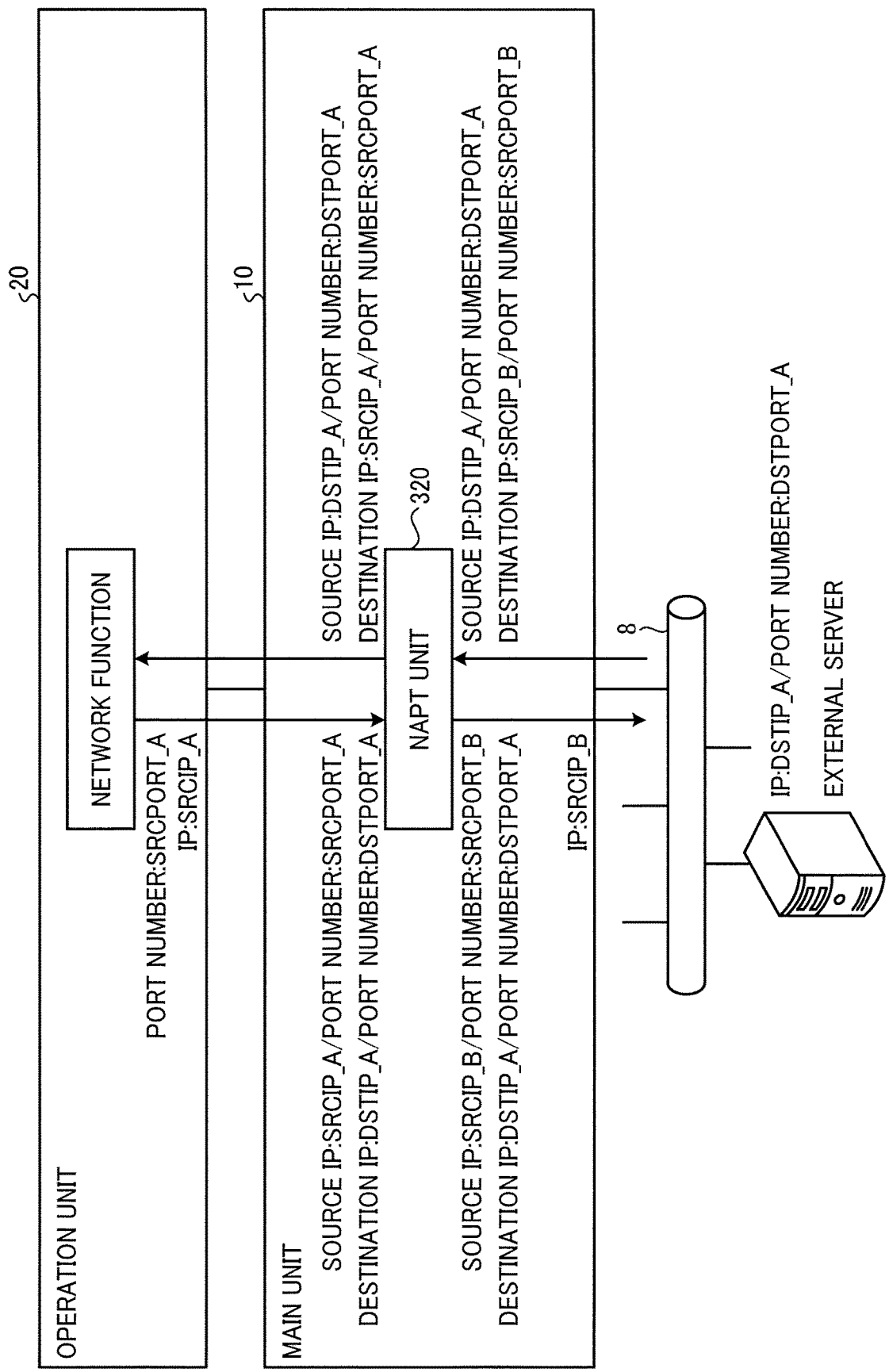
FIG. 6 is a block diagram illustrating a communication method of the operation unit.

FIG. 6 is a block diagram illustrating a communication method of the operation unit. The network address port (NAPT) unit 320 of the OS layer 103 of the main unit 10 is described with reference to FIG. 5B and FIG. 6.

The operation unit 20 can connect to the network 8 through the NAPT unit 320 of the OS layer 103 of the main unit 10. For example, as illustrated in FIG. 6, the network function of the operation unit 20 (implemented by the CPU 11 executing a program such as an application and controlling the communication I/F 25) is communicating with an external server through the main unit 10. In this example, the port number of the application that performs data communication of the operation unit 20 is "SRCPORT_A", and the internet protocol (IP) address of the operation unit 20 is "SRCIP_A".

An example of data transmission from the application of the operation unit 20 to the application of the external server is described below. In the example, the port number of the application that performs data communication on the external server is "DSTPORT_A", and the IP address of the external server is "DSTIP_A". The NAPT unit 320 converts the port number and the IP address of the transmission source (the operation unit 20) into the port number (SRCPORT_B) and the IP address (SRCIP_B) on the main unit 10 side, respectively, and transmits the converted port number and IP address as the transmission source to the external server.

Conversely, when the application of the operation unit 20 receives data from the application of the external server, the NAPT unit 320 converts the port number and the IP address of the data transmission destination (main unit 10) of the external server into a port number (SRCPORT_A) and an IP address (SRCIP_A) on the operation unit 20 side, respectively, and passes the data received from the external server to the operation unit 20.

In the example of FIG. 5A and FIG. 5B, the application market application 205 of the operation unit 20 uses the NAPT unit 320 of the main unit 10 to acquire the application list screen from the application market server 2. When the installation button 50 of one of the applications is pressed, the installer 221 of the operation unit 20 is activated, and the installer 221 downloads the application from the application server 3 and installs the application using the NAPT unit 320. In this way, it is possible to add the application to the operation unit 20 at any time.

(Functional Configuration of Operation Unit)

Figure 7:
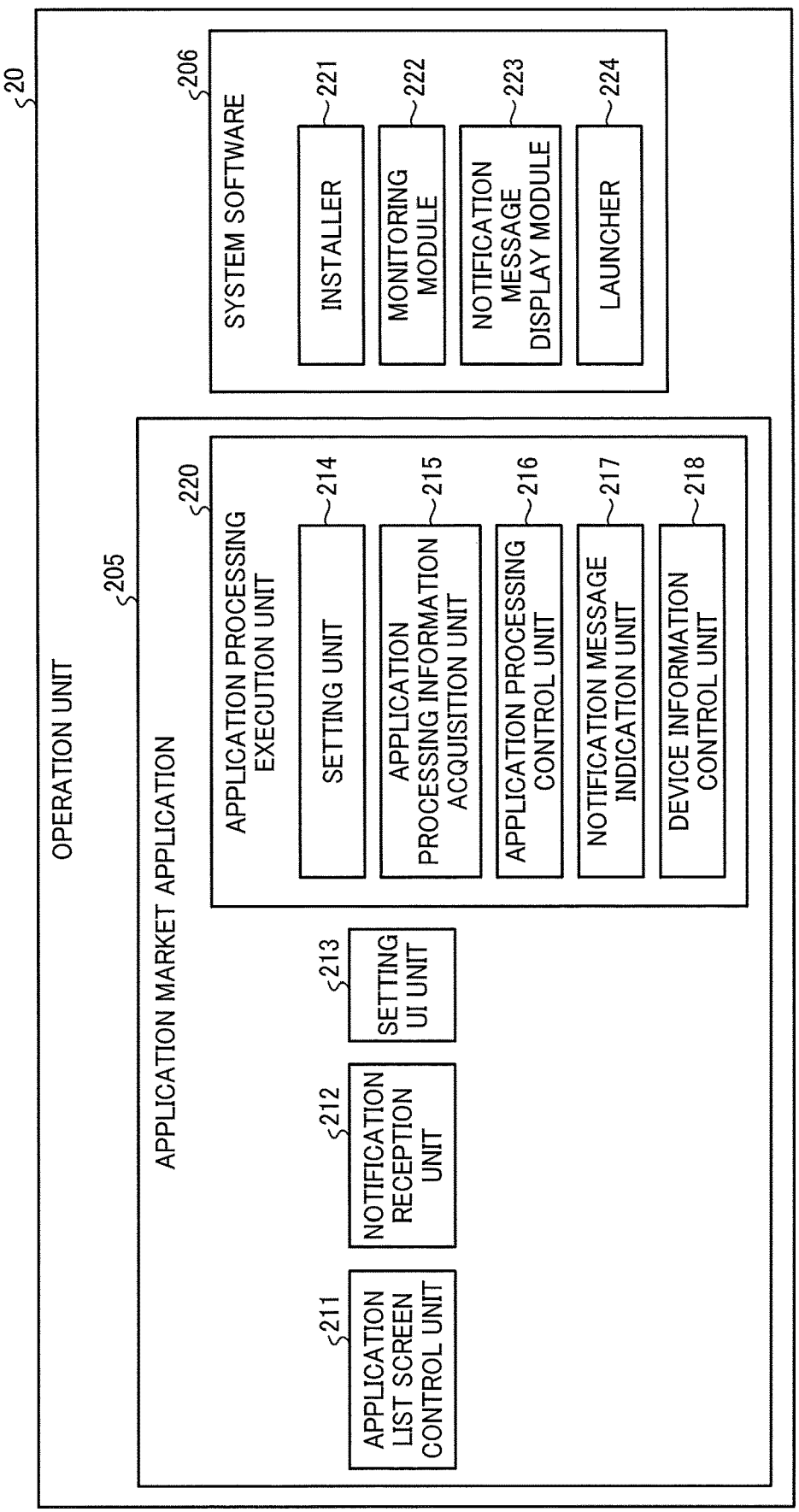
FIG. 7 is a block diagram illustrating an example of a functional configuration of the operation unit according to a first embodiment of the present disclosure.

FIG. 7 is a block diagram illustrating a functional configuration of the operation unit according to a first embodiment of the present disclosure. Although in FIG. 7 functions related to the first embodiment are mainly illustrated for the sake of explanatory convenience, the operation unit 20 may include other additional functions.

As illustrated in FIG. 7, the operation unit 20 includes an application market application 205 and system software 206. The application market application 205 provides functions of an application list screen control unit 211, a notification reception unit 212, a setting UI unit 213, and an application processing execution unit 220. In this example, the application processing execution unit 220 includes a setting unit 214, an application processing information acquisition unit 215, an application processing control unit 216, a notification message indication unit 217, and a device information control unit 218, and is implemented as a thread of the application market application 205. These functions are implemented by the CPU 21 of the operation unit 20 executing the application market application 205.

The system software 206 provides functions of an installer 221, a monitoring module 222, a notification message display module 223, and a launcher 224. These functions are implemented by the CPU 21 of the operation unit 20 executing the system software 206.

The application list screen control unit 211 acquires the application list screen from the application market server 2 and displays the acquired application list screen on the operation panel 27. As described above, the application list screen control unit 211 communicates with the application market server 2 through the NAPT unit 320 of the main unit 10.

Figures 8, 9:
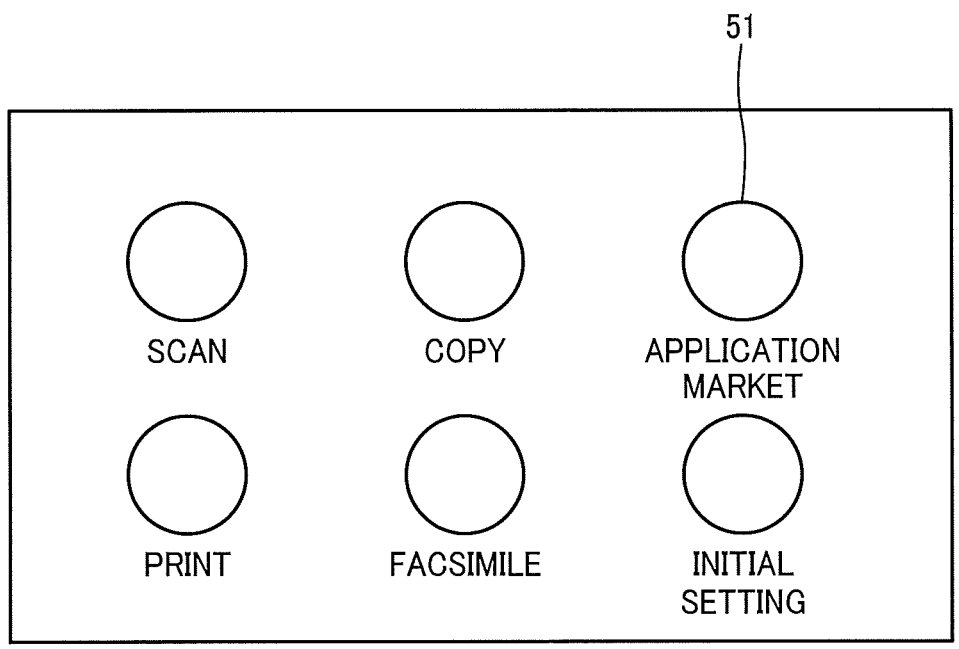
FIG. 8 is a diagram illustrating an example of an operation screen.
FIG. 9 is a diagram illustrating an example of a uniform resource locator (URL) scheme.

FIG. 8 is a diagram illustrating an example of an operation screen. FIG. 9 is a diagram illustrating an example of a URL scheme. In the present embodiment, the application market application 205 is activated when the user selects a corresponding icon 51 on the operation screen that accepts various operations as illustrated in FIG. 8. Then, the application list screen control unit 211 transmits a signal requesting the application list screen (hereinafter may be referred to as "display request" in some cases) to the application market server 2. Then, the application list screen control unit 211 acquires an application list screen as illustrated in FIG. 2 from the application market server 2 as a response and displays the application list screen on the operation panel 27. In this example, a URL scheme describing the execution procedure of the installation command is affixed to the installation button 50.

FIG. 9 illustrates an example of the URL scheme affixed to the installation button 50 corresponding to the application identified by an application identifier (ID) "49354". The "Installer" portion in FIG. 9 is the header portion of the URL scheme, and the header portion of the URL scheme may be referred to as a "scheme portion" in the description below. The scheme portion "Installer" represents information for identifying the application that executes the install command, and in this example, the scheme portion "Installer" represents the installer installed in the MFP 1. Also, the part of "installApp? Id" of "installApp? Id=49354" in FIG. 9 is an install command, and argument of the install command is "id=49354". The part of the URL scheme "installApp? Id=49354" represents the install command for the application identified by the application ID "49354".

The URL scheme illustrated in FIG. 9 represents the installation command in the URL format. When the installation button 50 affixed with this URL scheme is pressed, the installer 221 is activated, and the activated installer 221 installs the application identified by the application ID "49354". Specifically, the installer 221 downloads the application from the application server 3 and installs the downloaded application in the MFP 1. As described above, the installer 221 communicates with the application server 3 through the NAPT unit 320 of the main unit 10.

Figure 10:
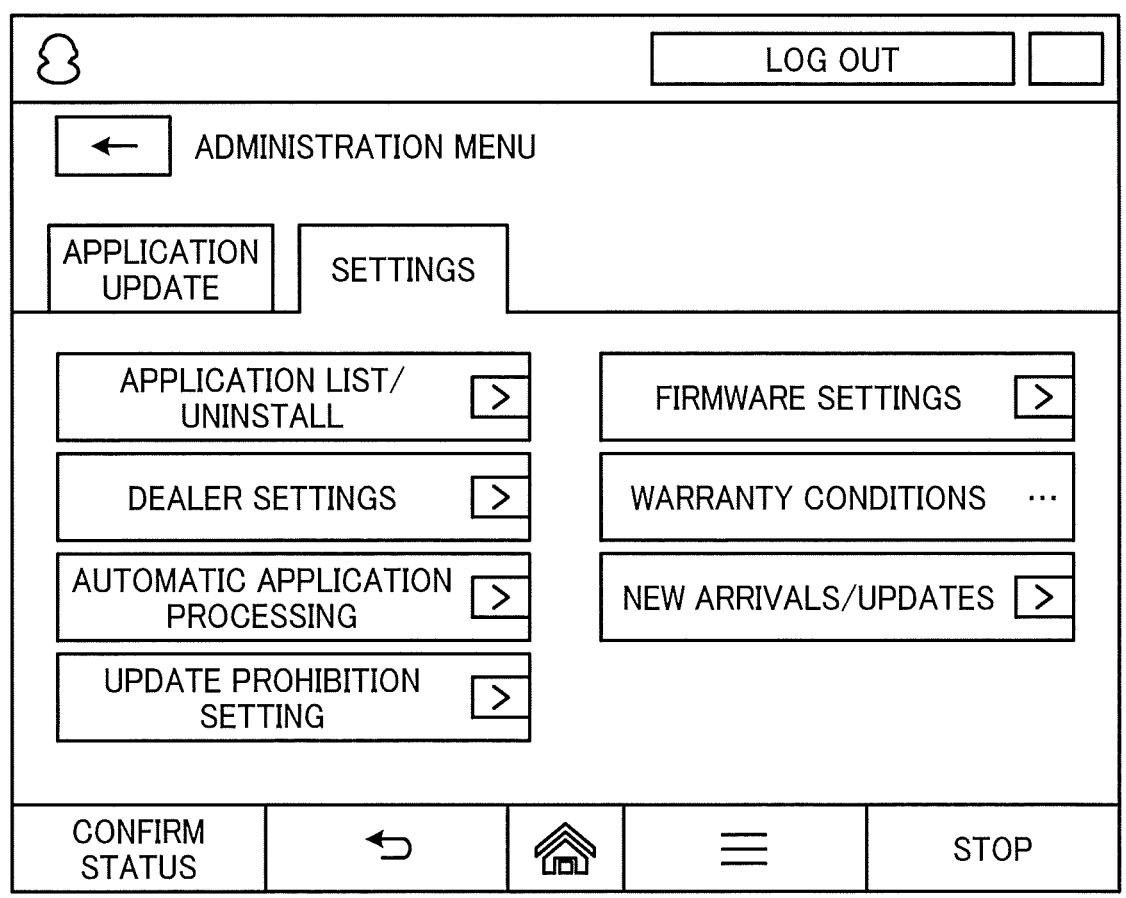
FIG. 10 is a diagram illustrating an example of an administration menu screen.
Figure 11:
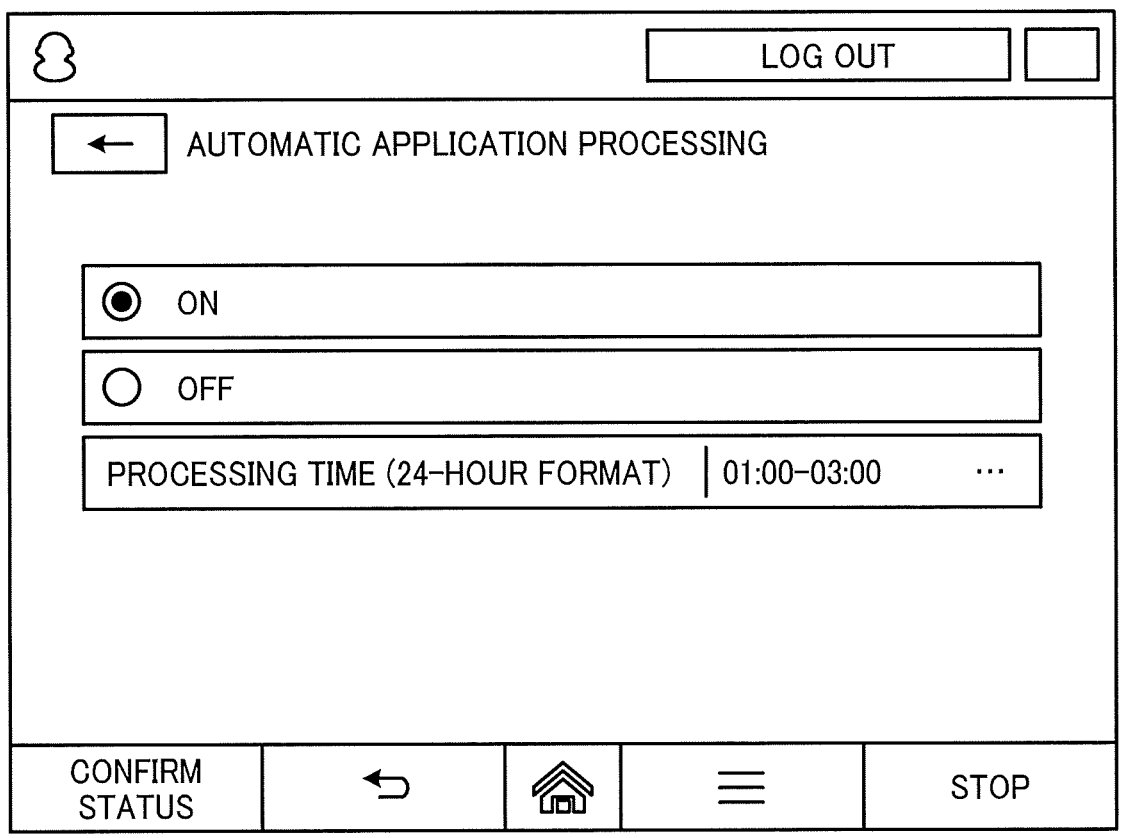
FIG. 11 is a diagram illustrating an example of an automatic application processing setting screen.
Figure 12:
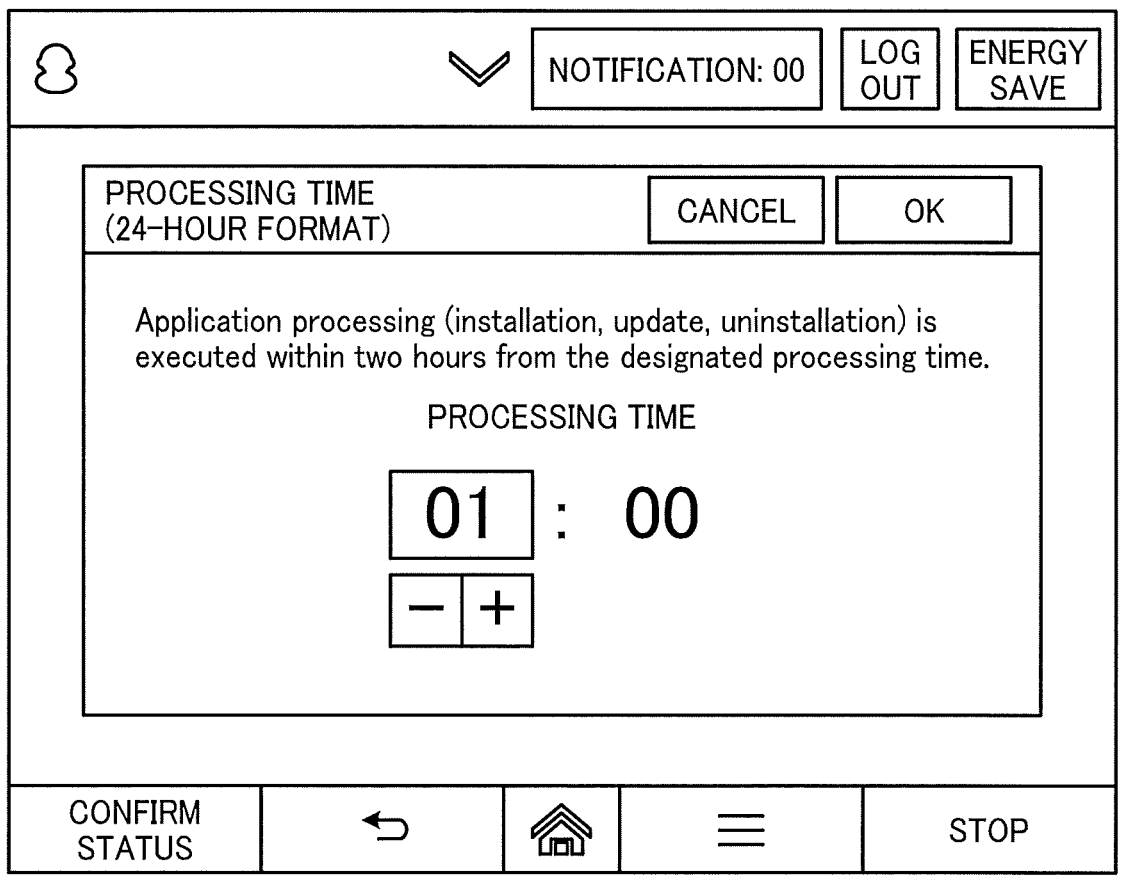
FIG. 12 is a diagram illustrating an example of a processing time setting screen.
Figure 13:
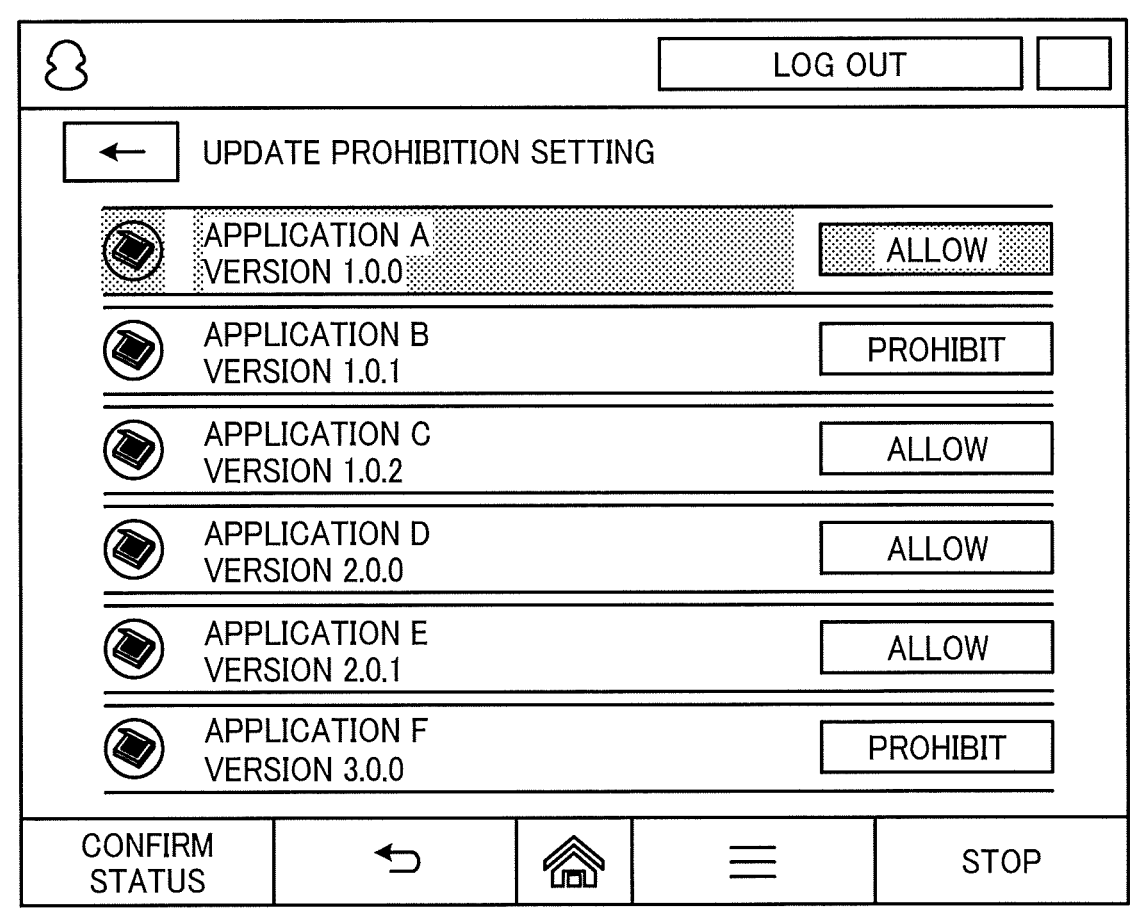

FIG. 10 is a diagram illustrating an example of an administration menu screen. FIG. 11 is a diagram illustrating an example of an automatic application processing setting screen. FIG. 12 is a diagram illustrating an example of a processing time setting screen. FIG. 13 is a diagram illustrating an example of an update prohibition setting screen. The description proceeds with continued reference to FIG. 7 as well as FIGS. 10 to 13.

The notification reception unit 212 receives a notification from the monitoring module 222 described below. The notification reception unit 212 functions as a receiver.

The setting UI unit 213 displays a screen for setting on the operation panel 27. For example, the setting UI unit 213 displays the administration menu screen as illustrated in FIG. 10 on the operation panel 27. When pressing of the "automatic application processing" button on the administration menu screen is accepted, the setting UI unit 213 displays an automatic application processing setting screen as illustrated in FIG. 11 on the operation panel 27. In this example, when a selection of "ON" indicating that setting of automatic application processing for applications that are installed or not uninstalled is enabled from the automatic application processing setting screen, automatic application processing becomes effective.

On the other hand, when accepting the selection of "OFF" indicating that the automatic application processing is disabled, the automatic application processing is not effective. In addition, when pressing of the "processing time" button is accepted from the automatic application processing setting screen, the setting UI unit 213 displays a processing time setting screen as illustrated in FIG. 12 on the operation panel 27 and receives the setting of the processing time (the time at which the automatic application processing is executed).

As illustrated in FIG. 7 and as described above, the application processing execution unit 220 includes the setting unit 214, the application processing information acquisition unit 215, the application processing control unit 216, the notification message indication unit 217, and the device information control unit 218.

The setting unit 214 performs various settings (including control for setting) in accordance with the input accepted on the screen displayed by the setting UI unit 213. The setting unit 214 sets processing time indicating the time of executing application processing based on a preset processing time zone. In this example, the setting unit 214 sets the time period from the time specified by the user to two hours later as the processing time zone, but the processing time zone can be set at any other time period. As described above, the processing time period is set in advance. The setting unit 214 can randomly select the time in the range of the preset processing time zone and set the selected time as the processing time. In this example, the setting unit 214 randomly determines processing time at 15-minute intervals. Accordingly, execution of the application processing can be shifted in relation to other MFPs that perform similar application processing. As a result, concentration of a load of each server (the application market server 2, the application server 3, the firmware distribution server 4, and the web application server 5) can be suppressed, and traffic of the network 8 can be reduced.

In the processing time setting screen illustrated in FIG. 12, the time zone from the designated processing time to two hours later is set as the processing time zone, but the processing time zone can be set at any other time period. In this case, it may be possible to set how many hours later the processing time period from the processing time. Further, in the above example, it is assumed that processing time is randomly determined at intervals of 15 minutes, but the present disclosure is not limited to this and the processing time may be randomly determined at other time intervals or the time interval may be settable.

In addition, in this example, when pressing of an update prohibition setting button on the administration menu screen illustrated in FIG. 10 is accepted, the setting unit 214 displays the update prohibition setting screen as illustrated in FIG. 13 on the operation panel 27. For each application, the user can decide whether automatic updating can be performed or not and selects "prohibit" for applications for which automatic updating should be prohibited. Upon accepting this selection, the setting unit 214 sets the application so as not to be updated automatically.

Referring again to FIG. 7, further description is given below. The setting unit 214 notifies the monitoring module 222 of the processing time set as described above. The monitoring module 222 monitors whether or not the processing time (the processing time notified from the setting unit 214) set by the setting unit 214 has been reached. When the processing time is reached, the monitoring module 222 notifies the application market application 205 (the notification reception unit 212) that the processing time is reached. In addition, in this example, when the MFP 1 is activated, the monitoring module 222 notifies the application market application 205 (the notification reception unit 212) of an activation notification indicating that the MFP 1 is activated. Furthermore, in this example, when the state in which the operation unit 20 has not accepted the operation by the user continues for a predetermined period, the monitoring module 222 changes the state of the operation unit 20 from the normal state (the operation unit 20 displays the screen) to the energy-saving state (sleep mode) in which the power consumption is lower than the state in which operation of the user is accepted. For example, the monitoring module 222 may stop the operation of the CPU 21.

Here, it may be considered that the combination of the monitoring module 222 and the SCS 312 corresponds to "a function (monitoring unit) that monitors whether or not the processing time set by the setting unit 214 has been reached" or either one of the monitoring module 222 and the SCS 312 may be regarded as corresponding to the function (monitoring unit).

The application processing information acquisition unit 215 acquires application processing information indicating an application that requires application processing (that is, installation, update, and uninstallation) among one or more applications that are installed or not installed in the MFP 1 (operation unit 20) from the application market server 2. In the present embodiment, the application processing information acquisition unit 215 transmits an acquisition request for requesting the application processing information to the application market server 2 when the processing time indicating the time of executing the application processing is reached and obtains application processing information from the application market server 2. The acquisition request includes a device identification number of the MFP 1 and information indicating a product ID, a version, and an application name for identifying the application for each of one or more applications installed in the MFP 1. In this example, the acquisition request includes the combination of the content of the application processing, the product ID, the version, and the application name in the same number as the applications that are installed and not installed.

Here, when the notification reception unit 212 receives the notification (notification of the processing time) from the monitoring module 222, the application processing information acquisition unit 215 transmits the above-described acquisition request to the application market server 2, and as a response, obtains application processing information. The application processing information acquisition unit 215 communicates with the application market server 2 through the NAPT unit 320 of the main unit 10. In this example, for each of one or more applications that require application processing, the application processing information includes the contents of the application processing, the product ID for identifying the application, information indicating the latest version of the application, and the application name. When there is no application requiring application processing, information indicating that there is no application requiring application processing as a response to the acquisition request (hereinafter, sometimes referred to as "information indicating that application processing is unnecessary" in the following description) is notified.

When acquiring the application processing information from the application market server 2, the application processing information acquisition unit 215 stores information indicating the number of applications requiring application processing in the HDD 14 of the main unit 10 as cache data. Note that the present disclosure is not limited to the above, and for example, the application processing information itself may be stored as cache data. The cache data is information on an application that requires application processing, and content of the cache data is arbitrary. On the other hand, when acquiring the information indicating that application processing is unnecessary from the application market server 2, the application processing information acquisition unit 215 clears the cache data in the HDD 14. Details are described below.

The application processing control unit 216 controls to process (application process) at least one of installation, update, and uninstallation of the application indicated by the application process information acquired by the application processing information acquisition unit 215. In this example, the application processing control unit 216 transmits to the installer 221 and the launcher 224 an application processing request for requesting application processing on one or more applications indicated by the application processing information. Here, the application processing request includes a combination of processing contents, product ID, version, and application name for each application that requires application processing.

Upon receiving the application processing request from the application processing control unit 216, the installer 221 performs application processing of the application that requires application processing. An application for which the installer 221 performs application processing is a native application that is directly installed, updated, and uninstalled on the MFP 1. The native application is not executed on the browser like a web application, but is an application directly executed on the OS. Here, the combination of the application processing control unit 216 and the installer 221 corresponds to "a function (application processing control unit) that controls application processing for an application indicated by the application processing information acquired by the application processing information acquisition unit 215" or either one of the application processing control unit 216 or the installer 221 may be regarded as corresponding to the function (application processing control unit). In addition, the installer 221 is an example of the "firmware update control unit" and updates the firmware when necessary in order to use the application indicated by the application processing information.

Upon receiving the application processing request from the application processing control unit 216, the launcher 224 performs application processing on the web application requiring application processing. More specifically, when processing content indicating installation is included in the application processing request, the launcher 224 registers an icon including a shortcut indicating the web application server 5 which is the download destination of the contents etc. of the corresponding web application, on the operation screen illustrated in FIG. 8. Further, when processing content indicating updating is included in the application processing request, the launcher 224 changes, for example, the download destination of the contents and the like with respect to shortcuts of already registered icons for the corresponding web application. Further, when processing content indicating uninstallation is included in the application processing request, the launcher 224 deletes the icon including the shortcut of the contents and the like concerning the corresponding web application.

Figure 14:
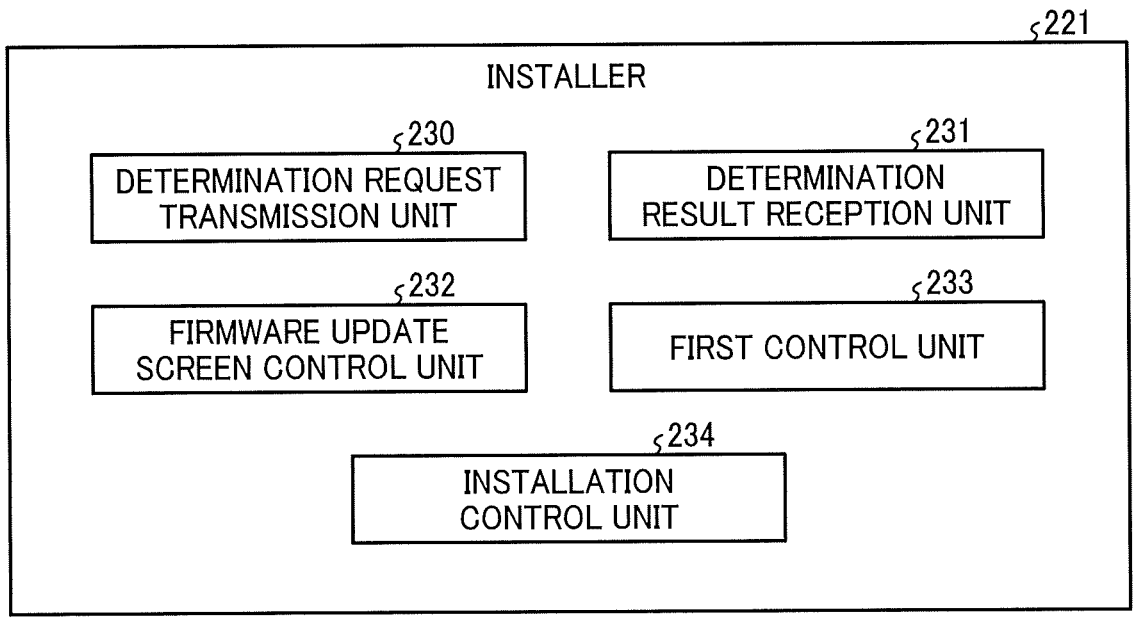
FIG. 14 is a block diagram illustrating an example of a functional configuration of an installer.
Figure 15:
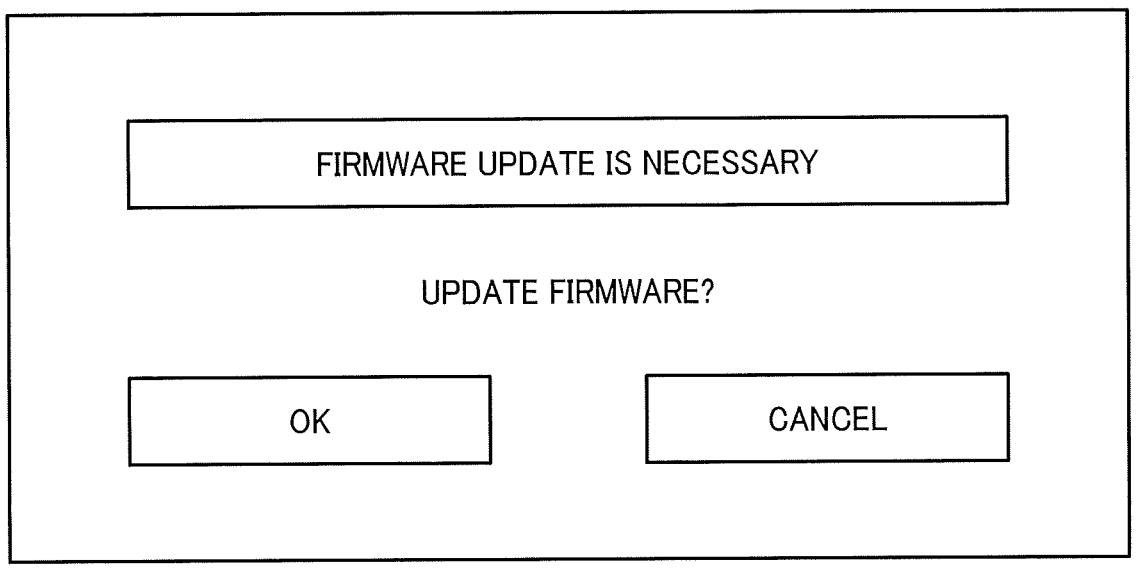
FIG. 15 is a diagram illustrating an example of a firmware update screen.
Figure 16:
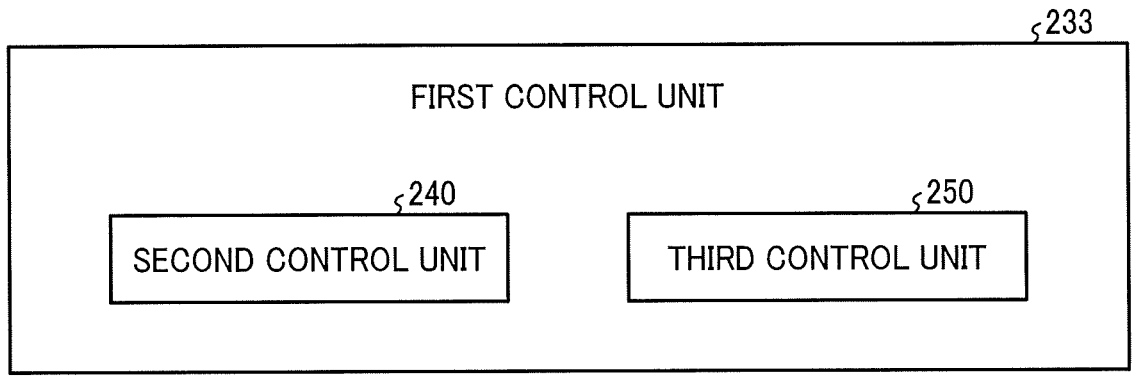
FIG. 16 is a block diagram illustrating an example of a functional configuration of a first control unit.
Figure 17:
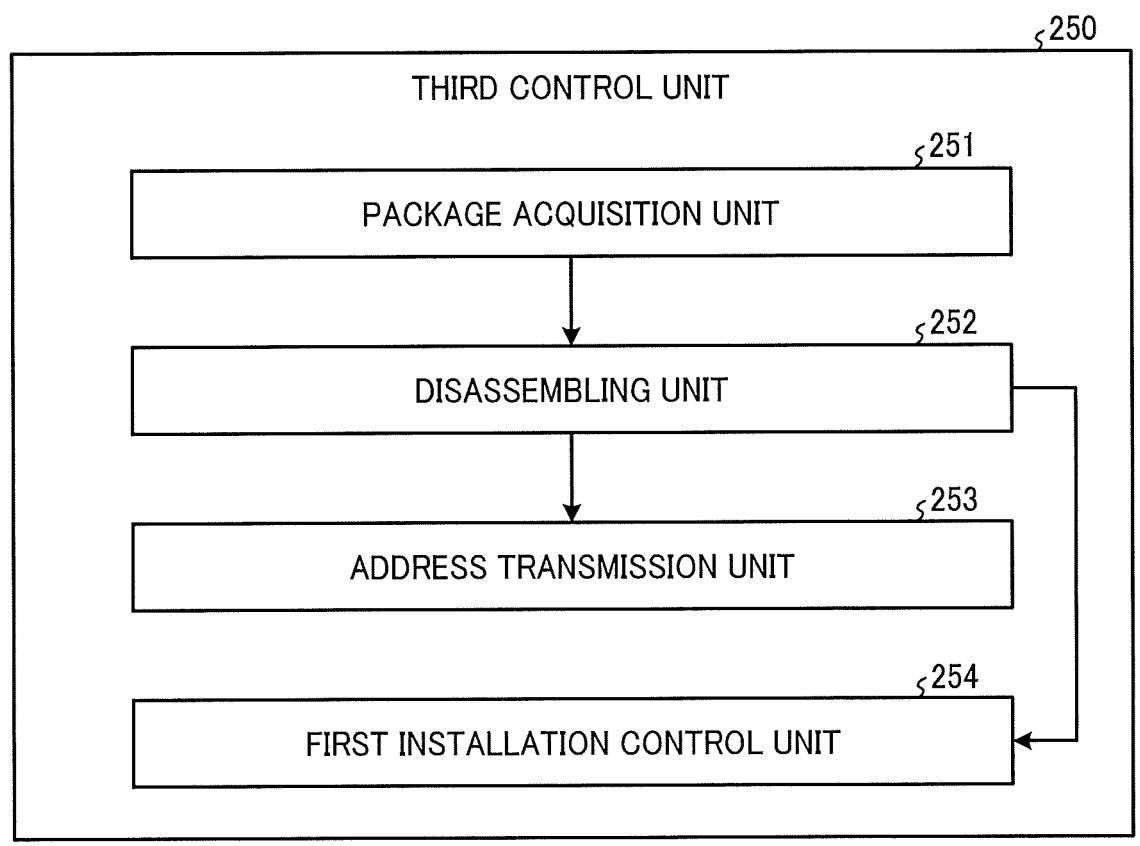
FIG. 17 is a block diagram illustrating an example of a functional configuration of a third control unit.
Figure 18:
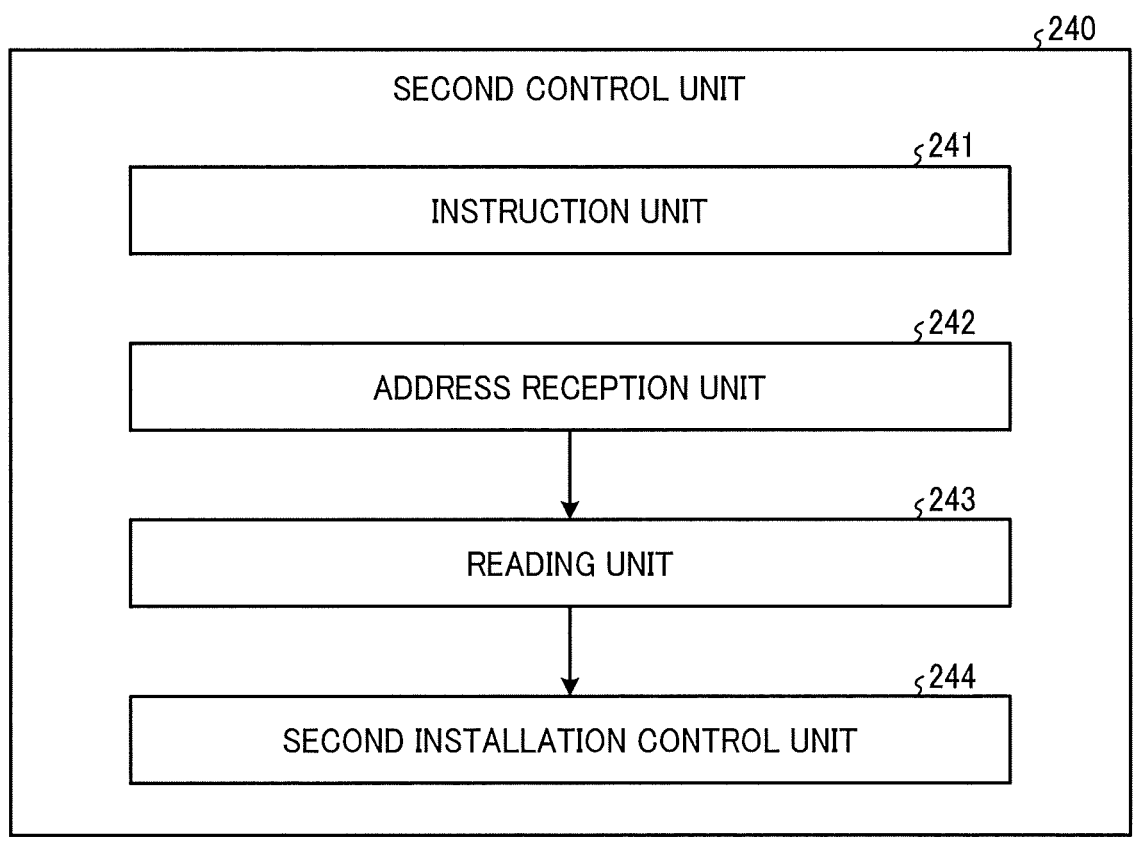
FIG. 18 is a block diagram illustrating an example of a functional configuration of a second control unit.

FIG. 14 is a block diagram illustrating an example of a functional configuration of an installer. FIG. 15 is a diagram illustrating an example of a firmware update screen. FIG. 16 is a block diagram illustrating an example of a functional configuration of a first control unit. FIG. 17 is a block diagram illustrating an example of a functional configuration of a third control unit. FIG. 18 is a block diagram illustrating an example of a functional configuration of a second control unit. Automatic updating of the firmware is described with reference to FIGS. 14 to 18.

As illustrated in FIG. 14, the installer 221 includes a determination request transmission unit 230, a determination result reception unit 231, a firmware update screen control unit 232, a first control unit 233, and an installation control unit 234. For ease of description, functions for updating the firmware are illustrated in FIG. 14, but the functions of the installer 221 are not limited to the functions for updating the firmware. As described above, the installer 221 communicates with the application server 3 through the NAPT unit 320 of the main unit 10.

The determination request transmission unit 230 transmits to the application server 3, a determination request for determining whether or not the application that requires installation or update can be used in the MFP 1. That is, when the processing content included in the application processing request indicates installation or update, the determination request transmission unit 230 transmits the above determination request information to the application server 3. The determination request includes a product ID for identifying an application included in the application processing request, module identification information for identifying a module for providing a function for using the application, and version information indicating the version of the module installed in the MFP 1. A module represents a unit of software for providing a specific function. In addition, the version indicates the attribute of the corresponding module and displays a larger value each time the module is updated.

The determination request in the present embodiment includes one or more product IDs included in the application processing request. Further, the determination request in the present embodiment includes module information associated with version information indicating the version of the module identified by the module ID for each of a plurality of module IDs (an example of module identification information) corresponding one-to-one to a plurality of modules installed on the MFP 1. However, the form of the determination request is not limited to the above description. For example, while the determination request includes a product ID included in the application processing request, a module ID for identifying a module that provides a function for using the application identified by the product ID, and version information indicating the version of the module identified by the module ID installed on the MFP 1, the determination request may not include a module ID that identifies a module that is not required for using an application identified by the product ID or version information that indicates the version of the module that is not required for using an application.

The determination result reception unit 231 receives the determination result indicating the result of the above-described determination from the application server 3 as a response to the above determination request. A specific configuration of the application server 3 is described below.

When the determination result received by the determination result reception unit 231 indicates that an application that requires installation or updating (an application identified by a product ID included in an application processing request indicating installation or update) cannot be used by the MFP 1, the firmware update screen control unit 232 displays a firmware update screen for accepting an instruction as to whether or not to update the firmware. In the present embodiment, the firmware update screen control unit 232 displays the firmware update screen as illustrated in FIG. 15 on the operation panel 27. In this example, the user can instruct to update the firmware by pressing the "OK" button illustrated in FIG. 15.

Referring again to FIG. 14, further description is given below. When the determination result received by the determination result reception unit 231 indicates that the application that requires installation or updating cannot be used by the MFP 1, the first control unit 233 updates the firmware that controls the operation of the MFP 1. In this example, when receiving an instruction to update the firmware through the above-described firmware update screen, the first control unit 233 updates the firmware.

In the present embodiment, when the determination result received by the determination result reception unit 231 indicates that the application that requires installation or updating cannot be used by the MFP 1, the first control unit 233 installs the first firmware indicating the latest firmware of the MFP 1. Here, the first firmware includes a second firmware indicating the latest version of the firmware for the operation unit 20 and a third firmware indicating the latest version of the firmware controlling the operation of the main unit 10. Further, as illustrated in FIG. 16, the first control unit 233 includes a second control unit 240 and a third control unit 250. The second control unit 240 installs the second firmware to the operation unit 20. The third control unit 250 installs the third firmware to the main unit 10.

The functions of the third control unit 250 are described below before describing the functions of the second control unit 240. As illustrated in FIG. 17, the third control unit 250 includes a package acquisition unit 251, a disassembling unit 252, an address transmission unit 253, and a first installation control unit 254.

The package acquisition unit 251 acquires a package in which the second firmware and the third firmware are integrated (that is, a package in which the latest version of the firmware for the operation unit 20 and the latest version of the firmware for the main unit 10 are integrated, (referred to as "the latest version of the package" in some cases), and stores the acquired package in the storage unit (the HDD 14 in this example). In the present embodiment, the package acquisition unit 251 transmits a package request for requesting the latest version of the package to the firmware distribution server 4 in accordance with an instruction from an instruction unit 241 to be described below and acquires the latest version package from the firmware distribution server 4 in response.

The disassembling unit 252 disassembles the latest version package acquired by the package acquisition unit 251 into the second firmware and the third firmware. As a method for disassembling the package, various known methods can be used.

The address transmission unit 253 transmits address data specifying an area (storage area) in which the second firmware is stored in a storage unit (the HDD 14 in this example) to the second control unit 240.

The first installation control unit 254 installs the third firmware disassembled by the disassembling unit 252 into the main unit 10. In this example, the first installation control unit 254 installs the third firmware in the main unit 10. More specifically, the first installation control unit 254 decompresses files such as programs and data included in the third firmware to make necessary settings and restarts the main unit 10 to modify the files that cannot be modified while the OS is running.

Next, the functions of the second control unit 240 are described. As illustrated in FIG. 18, the second control unit 240 includes the instruction unit 241, the address reception unit 242, a reading unit 243, and a second installation control unit 244.

When the determination result received by the determination result reception unit 231 indicates that the application that requires installation or updating cannot be used by the MFP 1, the instruction unit 241 requests the third control unit 250 (package acquisition unit 251) to acquire the latest package.

The address reception unit 242 receives the address data described above from the third control unit 250. The reading unit 243 reads the second firmware from the area specified by the address data received by the address reception unit 242 in the storage unit (the HDD 14 in this example).

The second installation control unit 244 installs the second firmware read by the reading unit 243 to the operation unit 20. In this example, the second installation control unit 244 installs the second firmware on the operation unit 20. More specifically, the second installation control unit 244 decompresses files such as programs and data included in the second firmware to make necessary settings and restarts the operation unit 20 to modify the files that cannot be modified while the OS is running.

In the present embodiment, the operation unit 20 includes the above-described second control unit 240, and the main unit 10 includes the above-described third control unit 250.

As described above, when the determination result received by the determination result reception unit 231 indicates that the application that requires installation or updating cannot be used by the MFP 1, the first control unit 233 installs the first firmware that indicates the latest firmware to the MFP 1. After the above described process by the first control unit 233 is performed, the determination request transmission unit 230 retransmits the determination request to the application server 3, and the above processing is repeated.

FIG. 19 to FIG. 23 are diagrams illustrating a firmware updating procedure. The updating procedure of the firmware is described with reference to FIGS. 19 to 23.

Figure 19:
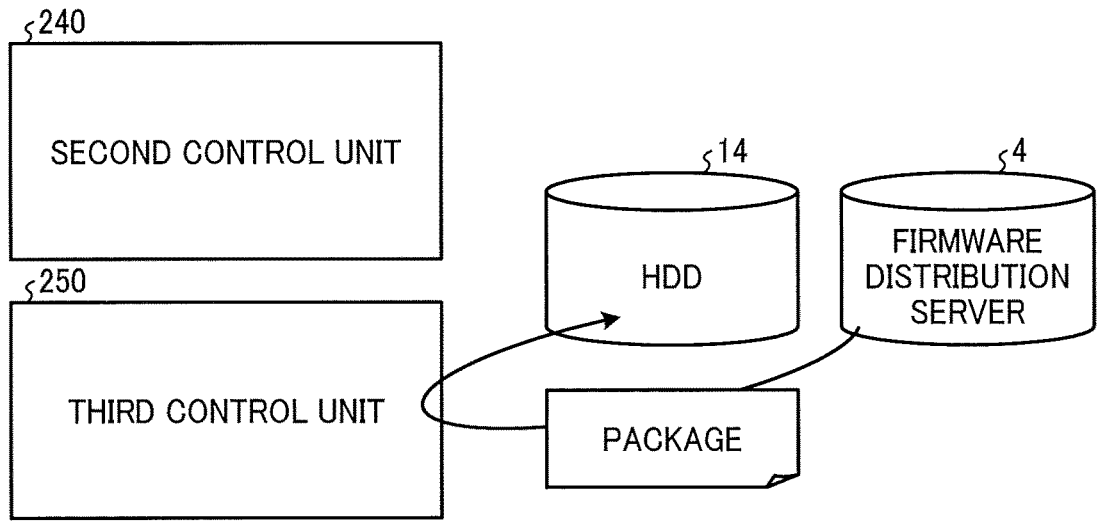
FIG. 19 is a diagram illustrating a firmware updating procedure.

First, as illustrated in FIG. 19, the third control unit 250 (the package acquisition unit 251) acquires a latest version package from the firmware distribution server 4 according to an instruction from the second control unit 240 (the instruction unit 241) and stores the obtained package in the HDD 14.

Figure 20:
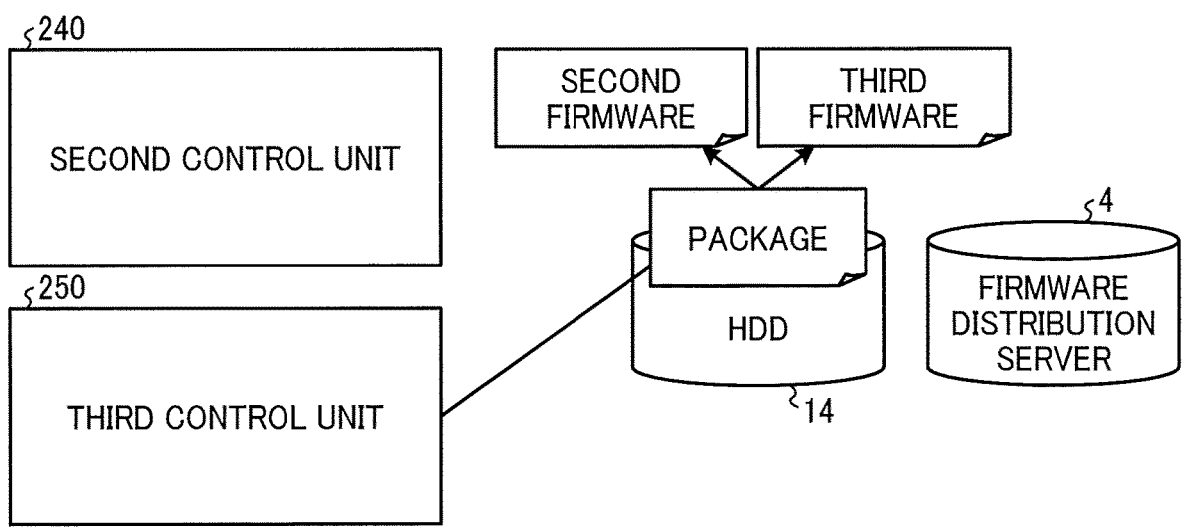
FIG. 20 is a diagram illustrating a firmware updating procedure.

Next, as illustrated in FIG. 20, the third control unit 250 (disassembling unit 252) disassembles the package stored in the HDD 14 into the second firmware and the third firmware.

Figure 21:
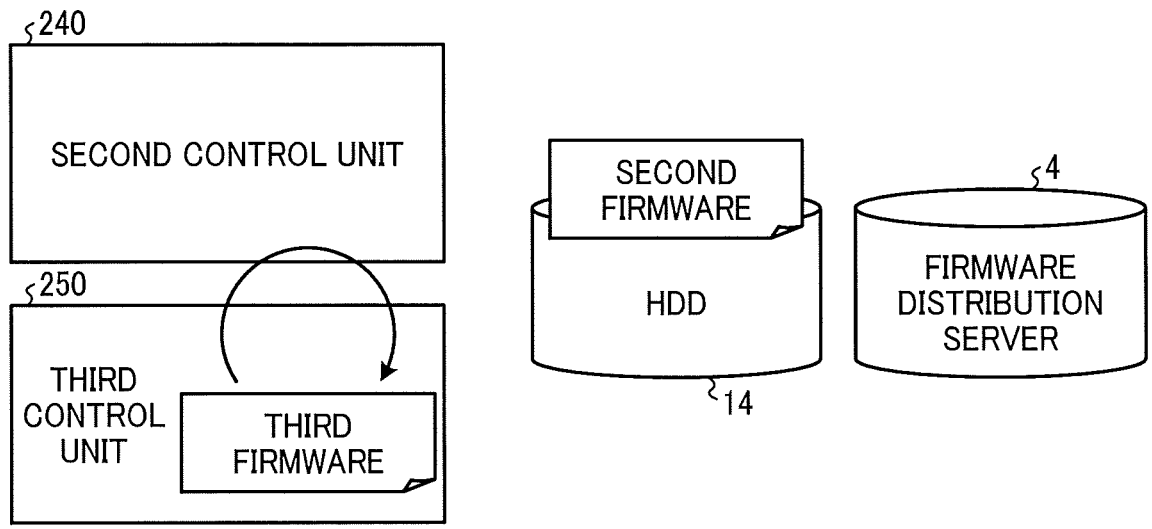
FIG. 21 is a diagram illustrating a firmware updating procedure.

Next, as illustrated in FIG. 21, the third control unit 250 (the first installation control unit 254) decompresses files such as programs and data included in the third firmware and makes necessary settings. At this stage, the main unit 10 is not restarted.

Figure 22:
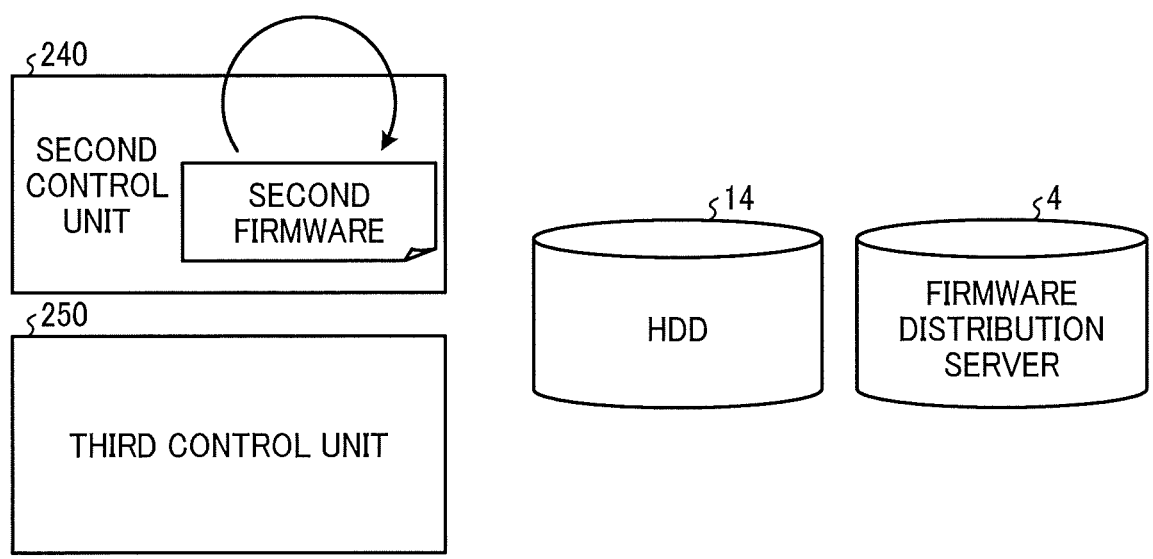
FIG. 22 is a diagram illustrating a firmware updating procedure.

Next, the third control unit 250 instructs the second control unit 240 to install the second firmware (instructs updating of the operation unit firmware). In this example, to instruct the installation of the second firmware, the third control unit 250 (the address transmission unit 253) transmits the address data capable of specifying the area in which the second firmware is stored in the HDD 14 to the second control unit 240. The second control unit 240 (the reading unit 243) reads the second firmware from the area specified by the address data received from the third control unit 250 in the HDD 14. Then, as illustrated in FIG. 22, the second control unit 240 (the second installation control unit 244) decompresses the files such as programs and data included in the second firmware and makes necessary settings. Then, after completing the settings other than files that cannot be modified while the OS is running, restart the operation unit 20, and modify files that cannot be modified while the OS is running. As a result, the installation of the second firmware into the operation unit 20 is completed.

Figure 23:
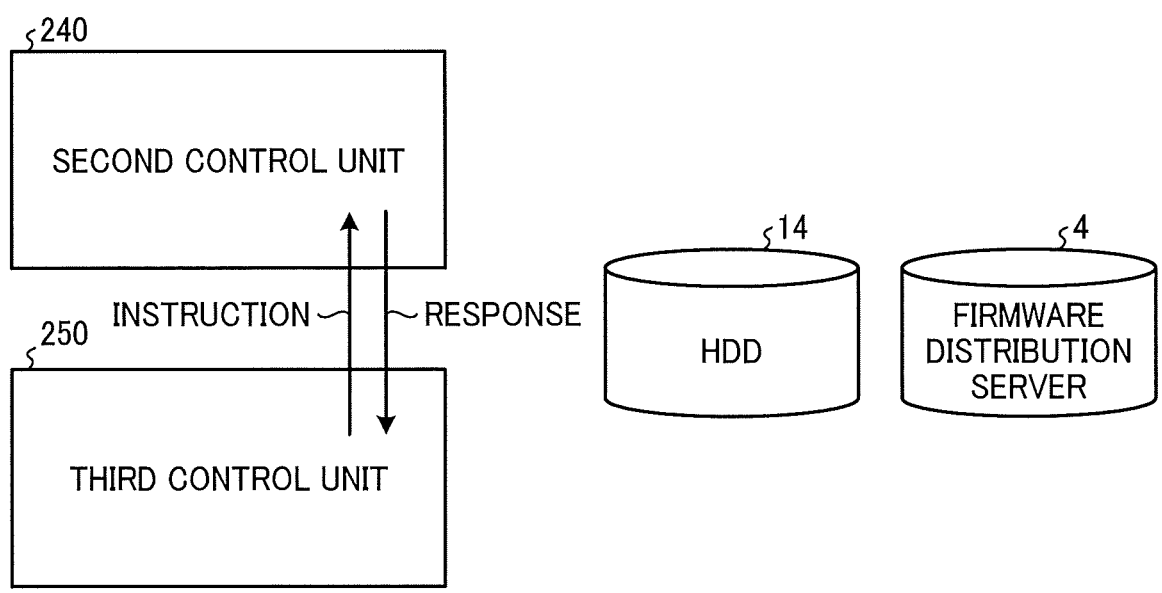
FIG. 23 is a diagram illustrating a firmware updating procedure.

After restart of the operation unit 20 is completed and the operation unit 20 and the main unit 10 are reconnected as illustrated in FIG. 23, the third control unit 250 instructs the second control unit 240 to install the second firmware again. At this stage, since installation of the second firmware to the operation unit 20 is complete, the second control unit 240 having received this instruction returns a response to the third control unit 250 confirming that the installation of the second firmware is complete. Upon receipt of this response, the third control unit 250 (the first installation control unit 254) restarts the main unit 10 and modifies files that cannot be modified while the OS is running. As a result, the installation of the third firmware in the main unit 10 is also completed.

As described above, after the installation of the first firmware to the MFP 1 is completed, the MFP 1 again requests the application server 3 for the above-described determination. That is, after the introduction of the first firmware to the MFP 1 is completed, the determination request transmission unit 230 transmits the above determination request again to the application server 3. The module information included in the determination request in this case is the latest module information while the product ID is the same as the previous time. In the same manner as described above, the application server 3 that has received the determination request performs the above-described determination and transmits the determination result to the MFP 1.

Referring again to FIG. 14, further description is given below. When the determination result received by the determination result reception unit 231 indicates that the application that requires installation or updating can be used by the MFP 1, the installation control unit 234 downloads the application from the application server 3. Then, the downloaded application is installed or updated in the MFP 1. As a result, installation or update of the application is completed.

Figure 24:
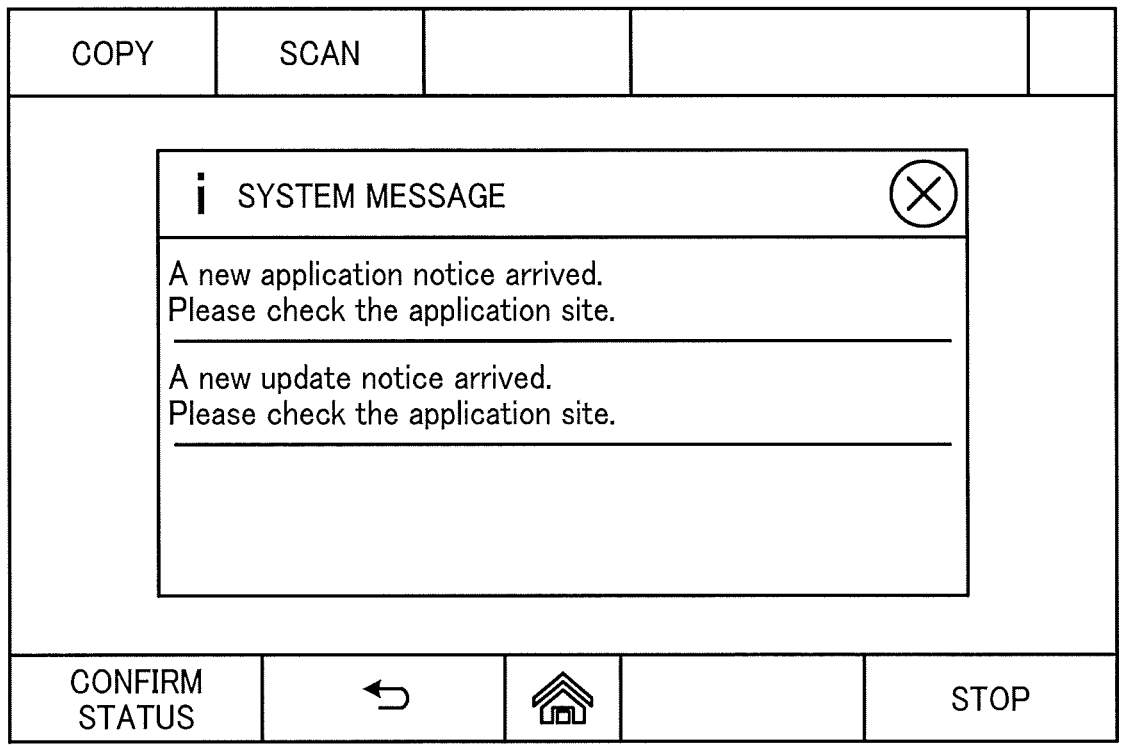
FIG. 24 is a diagram illustrating an example of a notification message screen.

FIG. 24 is a diagram illustrating an example of a notification message screen. The description proceeds with continued reference to FIG. 7 as well as FIG. 24 to describe the operation of the notification message indication unit 217.

When there is an application requiring application processing (typically when the application processing information is acquired from the application market server 2), the notification message indication unit 217 instructs the notification message display module 223 to display a notification message. In response to this instruction, the notification message display module 223 displays, for example, a notification message as illustrated in FIG. 24 on the operation panel 27. Here, a combination of the notification message indication unit 217 and the notification message display module 223 may be considered as a function to indicate that "when the application processing information indicates that an application requiring application processing exists, a notification message notifying that the application processing information is present is displayed on the display unit (notification message display control unit)", or either one of the notification message indication unit 217 or the notification message display module 223 may be considered to correspond to the "notification message display control unit".

The device information control unit 218 acquires, for each application (including both native application and web application) installed in the MFP 1, the product ID identifying the application, the version, and the application name in association with the device identification number of the MFP 1 as device information. Specifically, the device information control unit 218 acquires the product ID identifying the native application, the version, and the application name of the native application among the applications installed in the MFP 1 in association with the device identification number of the MFP 1 as the device information. In addition, the device information control unit 218 acquires the product ID identifying the web application (i.e. registered web application) among the applications installed in the WP 1, the version, the application name, in association with the device identification number of the MFP 1 as the device information.

Next, the acquisition timing of the device information by the device information control unit 218 is described. First, at the time of installation of the MFP 1, the device information control unit 218 acquires the device information of an application that has already been installed in the MFP 1 (preinstalled application). Then, the device information control unit 218 transmits the device information to the application market server 2, and the application market server 2 stores the received device information.

Further, when reaching the processing time indicating the time of executing the application processing, the device information control unit 218 acquires the device information and passes the device information to the application processing information acquisition unit 215. The application processing information acquisition unit 215 includes the received device information in the above-described acquisition request and transmits the acquisition request to the application market server 2.

After the application processing in the MFP 1 is completed, the device information control unit 218 acquires the device information and passes the device information to the application processing information acquisition unit 215. The application processing information acquisition unit 215 includes the received device information in the above-described acquisition request and transmits the acquisition request to the application market server 2. The application market server 2 stores (updates) the device information included in the received acquisition request as the latest state of the application installed in the MFP 1.

(Hardware Configuration of Application Market Server)

Figure 25:
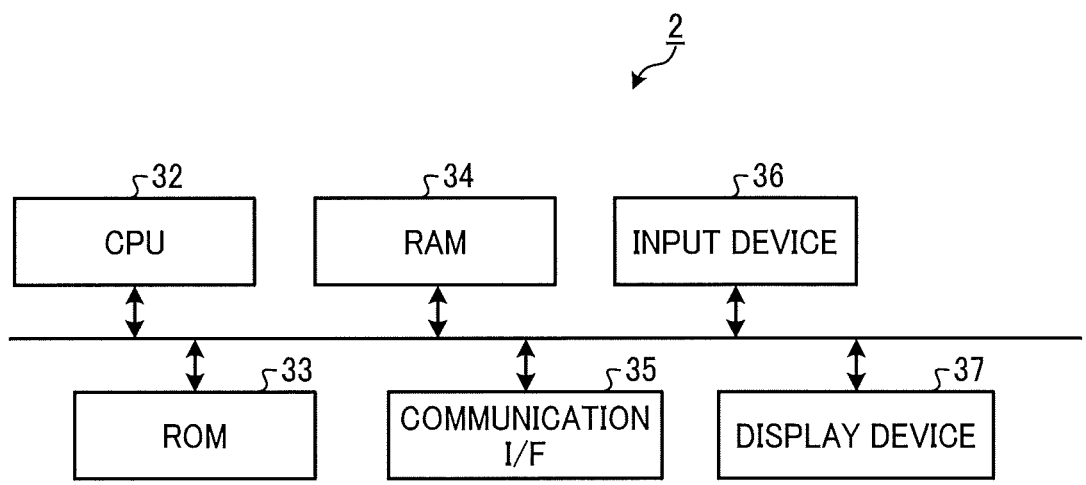
FIG. 25 is a diagram illustrating an example of a hardware configuration of an application market server.

FIG. 25 is a diagram illustrating an example of a hardware configuration of the application market server. The hardware configuration of the application server 3, the firmware distribution server 4, the web application server 5, and the setting PC 6 is the same as the hardware configuration illustrated in FIG. 25.

As illustrated in FIG. 25, the application market server 2 includes a CPU 32, a ROM 33, a RAM 34, a communication I/F 35, an input device 36, and a display device 37.

The CPU 32 controls the overall operation of the application market server 2. The ROM 33 is a nonvolatile memory storing various types of data such as programs. The RAM 34 is a volatile memory that functions as a work area of various processes executed by the CPU 32. The communication I/F 35 is an interface for connecting the main unit 10 to the network 8. The input device 36 is a device that allows a user to input operations. Examples of the input device 36 include a mouse and a keyboard. The display device 37 is a device that displays various types of information. Examples of the display device 37 includes a liquid crystal display.

(Functional Configuration and Operation of Application Market Server)

Figure 26:
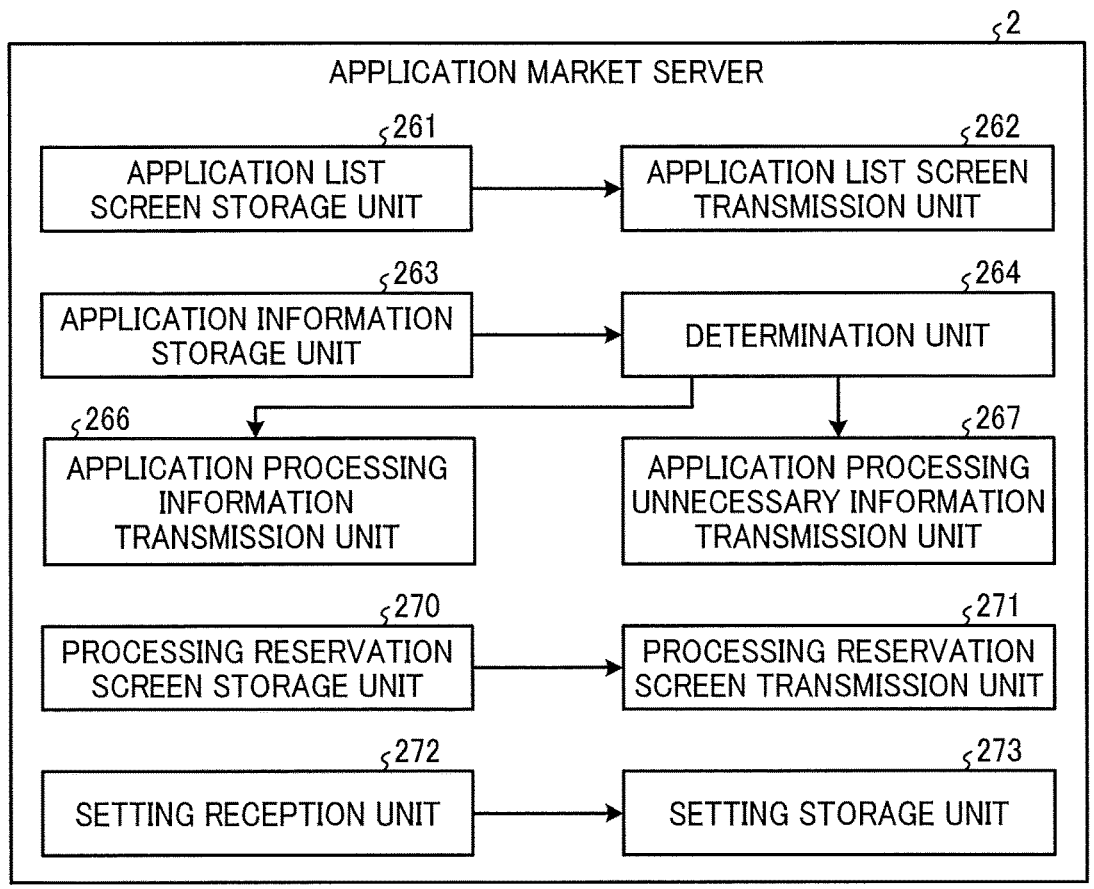
FIG. 26 is a block diagram illustrating an example of a functional configuration of an application market server.

FIG. 26 is a block diagram illustrating an example of a functional configuration of the application market server.

As illustrated in FIG. 26, the application market server 2 includes an application list screen storage unit 261, an application list screen transmission unit 262, an application information storage unit 263, a determination unit 264, an application processing information transmission unit 266, an information indicating that application processing is unnecessary transmission unit 267, a processing reservation screen storage unit 270, a processing reservation screen transmission unit 271, a setting reception unit 272, and a setting storage unit 273. The application market server 2 may include other additional functions, although functions related to the present embodiment are mainly illustrated for the sake of explanatory convenience in FIG. 26.

The application list screen storage unit 261 stores the application list screen described above. In response to the display request from the MFP 1, the application list screen transmission unit 262 transmits the application list screen stored in the application list screen storage unit 261 to the MFP 1.

The application information storage unit 263 stores application information in which a product ID, a version, and an application name are associated with each other for each of a plurality of applications displayed on the application list screen.

When receiving the above-described acquisition request from the MFP 1, the determination unit 264 determines whether there is an application requiring application processing, that is, installation, updating, or uninstallation.

In the present embodiment, the determination unit 264 refers to the application information stored in the application information storage unit 263, and when an application with a product ID different from the product ID included in the above acquisition request is included in the application information, and the application is an application that can be installed in the MFP 1, the determination unit 264 determines that the application is a candidate for installation. Next, the determination unit 264 determines that the application requires to be installed when "installation reservation" are included in the setting in processing reservation setting information (described below) stored in the setting storage unit 273 for the application determined as the installation candidate described above. On the other hand, when the "installation reservation" is not included in the setting in the processing reservation setting information for the application determined as the installation candidate described above, the determination unit 264 determines that the installation of application is unnecessary.

Also, the determination unit 264 refers to the application information stored in the application information storage unit 263, determines that an application included in the application information is a candidate for uninstallation, when the application is identified by the product ID included in the acquisition request described above, and the application is an application that can be installed in the MFP 1.

Next, the determination unit 264 determines that uninstallation of the application is necessary when "uninstall reservation" is included in the setting in the processing reservation setting information stored in the setting storage unit 273 for application that is determined to be candidate for uninstallation as described above. On the other hand, the determination unit 264 determines that uninstallation of the application is unnecessary when "uninstall reservation" is not included the setting in the process reservation setting information for applications that are determined to be candidates for uninstallation as described above.

Also, the determination unit 264 refers to the application information stored in the application information storage unit 263, and for each combination of product ID, version, and application name included in the above acquisition request, determines whether or not a version associated with a product ID that matches the product ID included in the combination is the same as the version included in the application information stored in the application information storage unit 263. When the versions are different, the determination unit 264 determines that the application identified by the product ID included in the combination is an update candidate. Then, when "update reservation" is included in the setting of the processing reservation setting information stored in the setting storage unit 273 for the application determined as the update candidate described above, the determination unit 264 determines that the application requires updating. On the other hand, when "update reservation" is not included in the setting in the processing reservation setting information for the application determined to be the update candidate described above, the determination unit 264 determines that updating is not necessary for the application.

When the determination unit 264 determines that there is an application requiring application processing, the application processing information transmission unit 266 transmits the above-described application processing information to the MFP 1 as a response to the acquisition request. The application processing information is information indicating the content of the application processing, a product ID for identifying the application, a version, and information indicating the application name for each of one or more applications determined to require application processing by the determination unit 264.

The information indicating that application processing is unnecessary transmission unit 267 transmits the aforementioned information indicating that application processing is unnecessary to the MFP 1 as a response to the acquisition request when the determination unit 264 determines that there is no application requiring application processing.

The processing reservation screen storage unit 270 stores information on a screen for setting processing reservation in the setting PC 6. Upon receiving the screen acquisition request for processing reservation from the setting PC 6, the processing reservation screen transmission unit 271 transmits a device list screen described below, a supported application list screen, and the current processing reservation setting information stored in the setting storage unit 273 to the setting PC 6.

The setting reception unit 272 receives the processing reservation setting information set by the setting PC 6 from the setting PC 6. The setting storage unit 273 stores the processing reservation setting information received by the setting reception unit 272.

In the present embodiment, the application list screen transmission unit 262, the determination unit 264, the application processing information transmission unit 266, the information indicating that application processing is unnecessary transmission unit 267, the processing reservation screen transmission unit 271 and the setting reception unit 272 included in the application market server 2 as described above are implemented by the CPU 32 executing a program stored in the ROM 33 or the like, but the present disclosure is not limited to this, and may be implemented by a dedicated hardware circuit (a semiconductor integrated circuit or the like), for example. The application list screen storage unit 261, the application information storage unit 263, the processing reservation screen storage unit 270, and the setting storage unit 273 are implemented by, for example, the ROM 33 or an auxiliary storage device such as an HDD. The functions of the application list screen transmission unit 262, the application processing information transmission unit 266, the information indicating that application processing is unnecessary transmission unit 267, the processing reservation screen transmission unit 271, and the setting reception unit 272 may be considered to be implemented by a combination of the CPU 32 executing a program and the communication I/F 35. For example, the function of the application list screen transmission unit 262 is implemented by the CPU 32 controlling the communication I/F 35 to transmit the application list screen to the MFP 1. The function of the application processing information transmission unit 266 is implemented by the CPU 32 controlling the communication I/F 35 to transmit the application processing information to the MFP 1. The function of the information indicating that application processing is unnecessary transmission unit 267 is implemented by the CPU 32 controlling the communication I/F 35 to transmit the information indicating that application processing is unnecessary to the MFP 1. The function of the processing reservation screen transmission unit 271 is implemented by the CPU 32 controlling the communication i/F 35 to transmit the device list screen to be described below, the supported application list screen, and the current processing reservation setting information stored in the setting storage unit 273 to the setting PC 6. The function of the setting reception unit 272 is implemented by the CPU 32 controlling the communication I/F 35 to receive the processing reservation setting information from the setting PC 6.

(Functional Configuration and Operation of Application Server)

Figure 27:
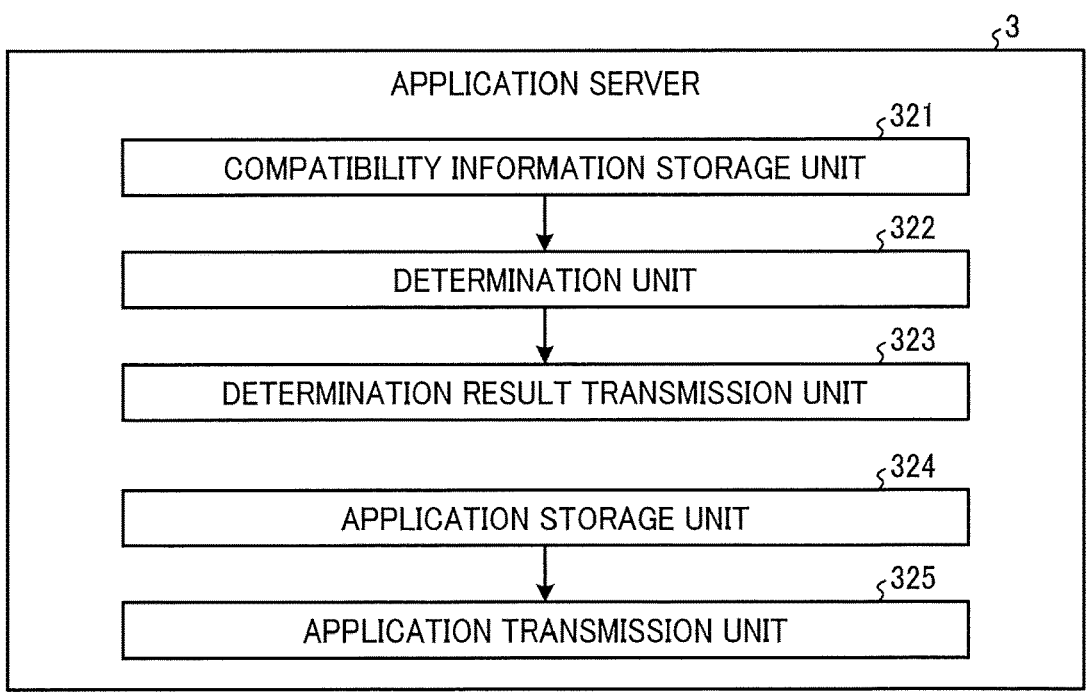
FIG. 27 is a block diagram illustrating an example of a functional configuration of an application server.
Figures 28, 29:
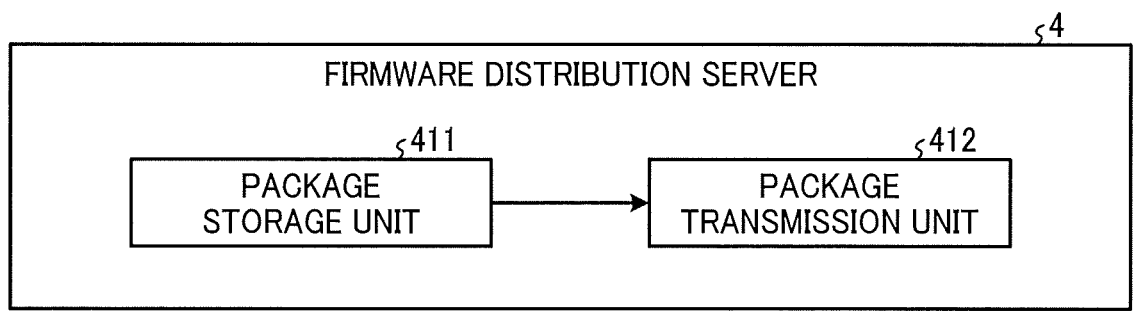
FIG. 28 is a diagram illustrating an example of compatibility information.
FIG. 29 is a block diagram illustrating an example of a functional configuration of a firmware distribution server.

FIG. 27 is a block diagram illustrating an example of a functional configuration of the application server. FIG. 28 is a diagram illustrating an example of compatibility information. An example of functions of the application server 3 is described with reference to FIGS. 27 and 28.

As illustrated in FIG. 27, the application server 3 includes a compatibility information storage unit 321, a determination unit 322, a determination result transmission unit 323, an application storage unit 324, and an application transmission unit 325. The application server 3 may include other additional functions although functions related to the present embodiment are mainly illustrated for the sake of explanatory convenience in FIG. 27.

The compatibility information storage unit 321 stores compatibility information. The compatibility information includes module identification information (module ID in this example) for identifying a module for providing a function necessary for using the application identified by the product ID associated with a minimum version of the module identified by the module identification information (the minimum version necessary for using the corresponding application) for each application identification information (product ID in this example) corresponding one-to-one to a plurality of applications.

Referring again to FIG. 27, further description is given below. When the determination request is received from the MFP 1, the determination unit 322 performs compatibility determination. More specifically, based on the determination request received from the MFP 1 and the compatibility information stored in the compatibility information storage unit 321, the determination unit 322 determines whether or not the application identified by the product ID included in the above-described determination request can be used in the MFP 1. In addition, the determination unit 322 identifies a combination that matches the combination of the product ID and the module ID included in the determination request information, out of the combination of the product ID and the module ID included in the compatibility information. Then, the determination unit 322 determines that the application identified by the product ID included in the above determination request cannot be used by the MFP 1 when the minimum version associated with the specified combination is larger than the version included in the determination request. On the other hand, when the minimum version is equal to or less than the version included in the determination request, the determination unit 322 determines that the application identified by the product ID included in the determination request can be used in the MFP 1.

The procedure of the compatibility determination in the present embodiment is as follows, but the present disclosure is not limited to the description below. When receiving the determination request from the MFP 1, the determination unit 322 specifies a product ID that matches the product ID included in the determination request, out of the plurality of product IDs included in the compatibility information described above. Then, the determination unit 322 specifies a module ID associated with the specified product ID in the above compatibility information (information in which version information is associated with each of a plurality of module IDs that correspond one-to-one to a plurality of modules mounted on the MFP 1), select a module ID (referred to as "selected module ID") that matches the specified module ID from a plurality of module IDs included in the above-described module information included in the determination request and selects the version information (referred to as "selected version information") associated with the selected module ID in the module information. Then, the determination unit 322 specifies a combination that matches with the combination of the product ID included in the above-described determination request and the above selected module ID of the combinations of the product ID and the module ID included in the above compatibility information, and when the minimum version associated with the specified combination is greater than the version indicated by the selected version information, determines that the application identified by the product ID included in the above determination request cannot be used by the MFP 1.

The determination result transmission unit 323 illustrated in FIG. 27 transmits the determination result indicating the result of the above-described compatibility determination to the MFP 1. The application storage unit 324 stores a plurality of applications (native applications). In response to a request from the MFP 1, the application transmission unit 325 transmits the application stored in the application storage unit 324 to the MFP 1. The above is the configuration of the application server 3.

In the present embodiment, the functions (the determination unit 322, the determination result transmission unit 323, the application transmission unit 325, and the like) of each unit of the application server 3 are implemented by the CPU 32 executing a program stored in the ROM 33 or the like. However, the present disclosure is not limited to the above description. For example, at least a part of the functions of each part of the application server 3 described above may be implemented by a dedicated hardware circuit (semiconductor integrated circuit or the like). Further, the compatibility information storage unit 321 and the above-described application storage unit 324 are implemented by the ROM 33 or the like, for example. The functions of the determination result transmission unit 323 and the application transmission unit 325 may be implemented by a combination of the CPU 32 that executes the program and the communication I/F 35. For example, the function of the determination result transmission unit 323 is implemented by the CPU 32 controlling the communication I/F 35 to transmit the determination result to the MFP 1. Further, for example, the function of the application transmission unit 325 is implemented by the CPU 32 controlling the communication I/F 35 to transmit the application to the MFP 1.

(Functional Configuration and Operation of Firmware Distribution Server)

FIG. 29 is a block diagram illustrating an example of a functional configuration of the firmware distribution server.

As illustrated in FIG. 29, the firmware distribution server 4 includes a package storage unit 411 and a package transmission unit 412. The firmware distribution server 4 may include other additional functions although functions related to the present embodiment are mainly illustrated in FIG. 29 for the sake of explanatory convenience.

The package storage unit 411 stores the latest version of the package. In response to the package request from the MFP 1, the package transmission unit 412 transmits the latest version package stored in the package storage unit 411 to the MFP 1.

In the present embodiment, the function of the package transmission unit 412 included in the firmware distribution server 4 is implemented by the CPU 32 executing the program stored in the ROM 33 and the like, but the present disclosure is not limited to this description and may be implemented by a dedicated hardware circuit (semiconductor integrated circuit or the like), for example. Further, the package storage unit 411 described above is implemented by, for example, the ROM 33 or an auxiliary storage device such as an HDD. The function of the package transmission unit 412 may be considered as implemented by a combination of the CPU 32 that executes the program and the communication I/F 35. For example, the function of the package transmission unit 412 is implemented by the CPU 32 controlling the communication I/F 35 to transmit the package to the MFP 1.

(Functional Configuration and Operation of Web Application Server)

Figure 30:
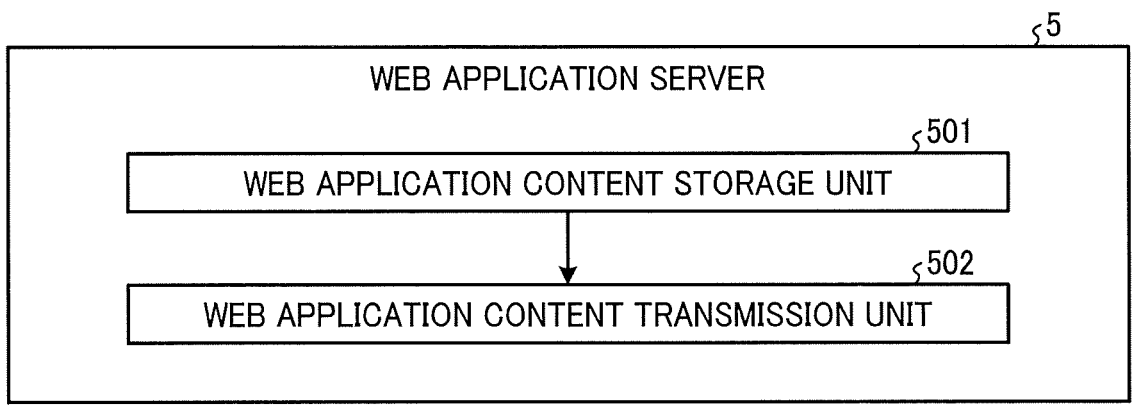
FIG. 30 is a block diagram illustrating an example of a functional configuration of a web application server.

FIG. 30 is a block diagram illustrating an example of a functional configuration of a web application server.

As illustrated in FIG. 30, the web application server 5 includes a web application content storage unit 501 and a web application content transmission unit 502. The web application server 5 may include other additional functions, although functions related to the present embodiment are mainly illustrated in FIG. 30 for the sake of explanatory convenience.

The web application content storage unit 501 stores contents and the like used in a plurality of applications (web applications). In response to a request from the MFP 1, the web application content transmission unit 502 transmits the contents etc. of the web application stored in the web application content storage unit 501 to the MFP 1.

In the present embodiment, the function of the web application content transmission unit 502 included in the web application server 5 is implemented by the CPU 32 executing the program stored in the ROM 33 and the like, but the present disclosure is not limited to this description and may be implemented by a dedicated hardware circuit (semiconductor integrated circuit or the like), for example. Further, the above-described web application content storage unit 501 is implemented by, for example, the ROM 33 or an auxiliary storage device such as an HDD. The function of the web application content transmission unit 502 may be considered as implemented by a combination of the CPU 32 that executes the program and the communication I/F 35. For example, the function of the web application content transmission unit 502 is implemented by the CPU 32 controlling the communication I/F 35 to transmit the package to the MFP 1.

(Functional Configuration and Operation of Setting PC)

Figure 31:
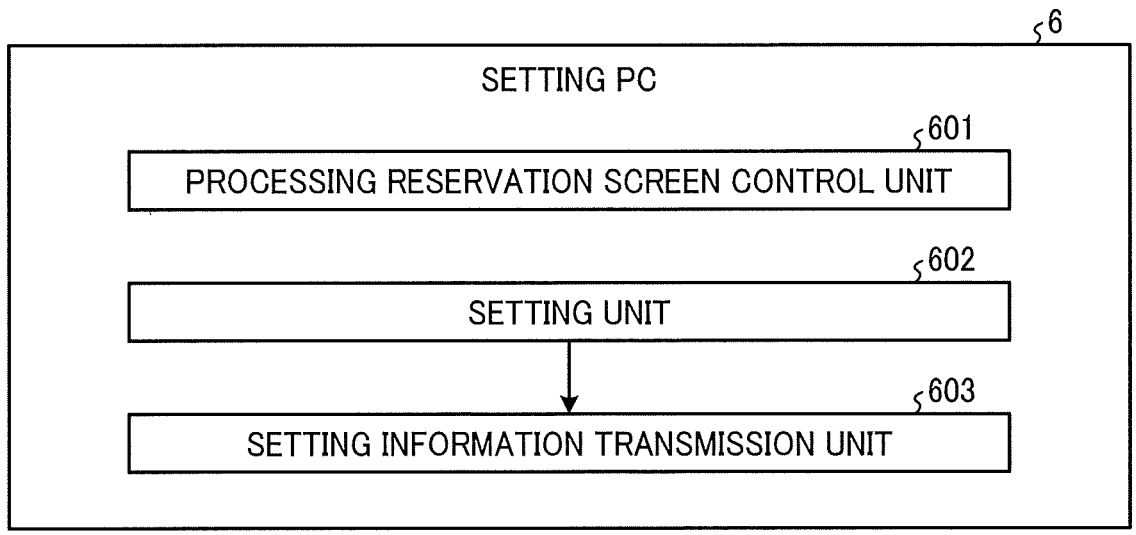
FIG. 31 is a block diagram illustrating an example of a functional configuration of a setting personal computer (PC)

FIG. 31 is a block diagram illustrating an example of a functional configuration of the setting PC. FIG. 32 is a diagram illustrating an example of the device list screen. FIG. 33 is a diagram illustrating an example of the supported application list screen. An example of the functions of the setting PC 6 is described with reference to FIGS. 31 to 33.

As illustrated in FIG. 31, the setting PC 6 includes a processing reservation screen control unit 601, a setting unit 602, and a setting information transmission unit 603. The setting PC 6 may include other additional functions, although functions related to the present embodiment are mainly illustrated in FIG. 31 for the sake of explanatory convenience.

The processing reservation screen control unit 601 acquires the device list screen, the supported application list screen, the current processing reservation setting information, and the like from the application market server 2 and displays the acquired screen on the display device 37.

In this embodiment, for example, when a device list screen as illustrated in FIG. 32 is displayed, the processing reservation screen control unit 601 acquires the device information of each device together with the device list screen from the application market server 2 and displays the device identification number and the model name of each device. The device list screen illustrated in FIG. 32 is an example and in addition to the device identification number and the model name, for example, a version or the like may be displayed.

On the device list screen illustrated in FIG. 32, the user selects a target device (MFP 1 in this example) for making reservation setting of application processing. When a specific device is selected on the device list screen as described above, the processing reservation screen control unit 601 acquires information of a newly installable application from the application information of the application market server 2 for the specific device and the current processing reservation setting information of the specific device and displays the supported application list screen illustrated in FIG. 33, for example. The processing reservation setting information is, for example, setting information in which reservation processing information such as "install reservation", "uninstall reservation", "update reservation" and the like is associated with the product ID for identifying each application. Then, the processing reservation screen control unit 601 displays the information on the installed application based on the acquired device information and the information on the newly installable application on the supported application list screen. In the example illustrated in FIG. 33, "application name", "version", "application state" (current state and settings of the application) and "processing reservation" are displayed as information on the application.

For example, when the target application is not installed and the current processing reservation setting information does not include "installation reservation" for the application, the processing reservation screen control unit 601 displays "not installed" as the application state. On the other hand, when "installation reservation" for the application is included in the current processing reservation setting information, the processing reservation screen control unit 601 displays "installation reserved" as the application state.

Further, for example, if the target application is already installed and it is determined that update is not necessary from the acquired device information and the application information, the processing reservation screen control unit 601 displays "installed" as the application state for the application on the screen. In addition, when the processing reservation screen control unit 601 determines that updating is possible from the acquired device information and the application information and the current processing reservation setting information does not include "update reservation" for the application, the processing reservation screen control unit 601 displays "not updated" as the application state. Furthermore, when the processing reservation screen control unit 601 determines that updating is possible from the acquired device information and application information, and "update reservation" for the application is included in the current processing reservation setting information, the processing reservation screen control unit 601 displays "update reserved" as the application state.

Further, for example, when the target application is already installed and the current processing reservation setting information includes "uninstallation reservation" for the application, the processing reservation screen control unit 601 displays "uninstallation reserved" as the application state. In addition, when the target application is not installed but has a record of installation in the past, the processing reservation screen control unit 601 displays "uninstalled" as the application state.

Further, as illustrated in FIG. 33, by selecting the desired application state in a check box displayed at the top of the screen, a list of applications in the selected application state can be displayed. Note that the above-described application states are examples, and other descriptions may be used as long as the current application state and the settings can be recognized.

Further, the processing reservation screen control unit 601 displays selectable options for processing that can be reserved in the column of "processing reservation" in accordance with the application state displayed on the supported application list screen as described above. For example, when the application state is "installation reserved", the processing reservation screen control unit 601 causes the processing reservation column to display "cancel installation reservation" as a selectable option. Further, when the application state is "not updated", the application can be updated or uninstalled, so the processing reservation screen control unit 601 displays "reserve update" and "reserve uninstallation" in the processing reservation column as selectable options. A pull-down menu may be used in the processing reservation column when a plurality of options is available for processing reservation.

Referring again to FIG. 31, further description is given below. The setting unit 602 performs various settings according to the input received on the supported application list screen. Specifically, the setting unit 602 sets the processing selected by the user in the processing reservation column as processing to reserve for the corresponding application. The setting information transmission unit 603 transmits the information set by the setting unit 602 as processing reservation setting information to the application market server 2. For example, when "cancel installation reservation" is selected by the user, the setting information transmission unit 603 may delete a product ID for identifying the application which was regarded as "installation reservation" and information associating the processing reservation information "installation reservation" from the processing reservation setting information before transmission.

In the present embodiment, the function of each of the setting PC 6, the processing reservation screen control unit 601, the setting unit 602, and the setting information transmission unit 603 is implemented by the CPU 32 executing a program stored in the ROM 33 or the like, but the present disclosure is not limited to this description, and may be implemented by a dedicated hardware circuit (semiconductor integrated circuit or the like), for example. The function of the setting information transmission unit 603 may be considered as implemented by a combination of the CPU 32 that executes the program and the communication I/F 35. For example, the function of the setting information transmission unit 603 is implemented by the CPU 32 controlling the communication I/F 35 to transmit the processing reservation setting information to the application market server 2.

(Operation Procedure of MFP)

FIG. 34 is a sequence diagram illustrating an example of operation by the MFP in response to an input of a processing time.

In step S100, the user inputs the desired processing time on the screen (processing time setting screen) displayed by the setting UI unit 213. In step S101, the application processing execution unit 220 (setting unit 214) stores the processing time input on the processing time setting screen in the storage unit (for example, the flash memory 24 or the like) of the operation unit 20. In step S102, the application processing execution unit 220 (setting unit 214) instructs the monitoring module 222 to set automatic application processing. In this instruction, information indicating the processing time input from the user is included. In step S103, the monitoring module 222 notifies the main unit 10 of the processing time in response to the instruction.

In step S104, when the operation unit 20 has not received any operation by the user for a predetermined period, the monitoring module 222 shifts the state of the operation unit 20 to a sleep mode. In step S105, the SCS 312 of the main unit 10 that has received the processing time from the monitoring module 222 through the web server 301 stores the received processing time in the storage unit (for example, the HDD 14 or the like) of the main unit 10 and starts the clock. In this example, the SCS 312 of the main unit 10 has a function of detecting whether or not the processing time has been reached. In step S106, when a state in which the main unit 10 does not execute image processing such as printing or the like (i.e., an idle state) continues for a predetermined period, the SCS 312 executes an energy-saving mode in which only timekeeping and communication with the network 8 remain operable (a state in which the power consumption is lower than the normal state in which image processing is possible). In the energy-saving mode, functions other than timekeeping and communication with the network 8 may also be operable. In short, it suffices as long as power consumption is lower than the normal state in which image processing can be executed.

Figure 35:
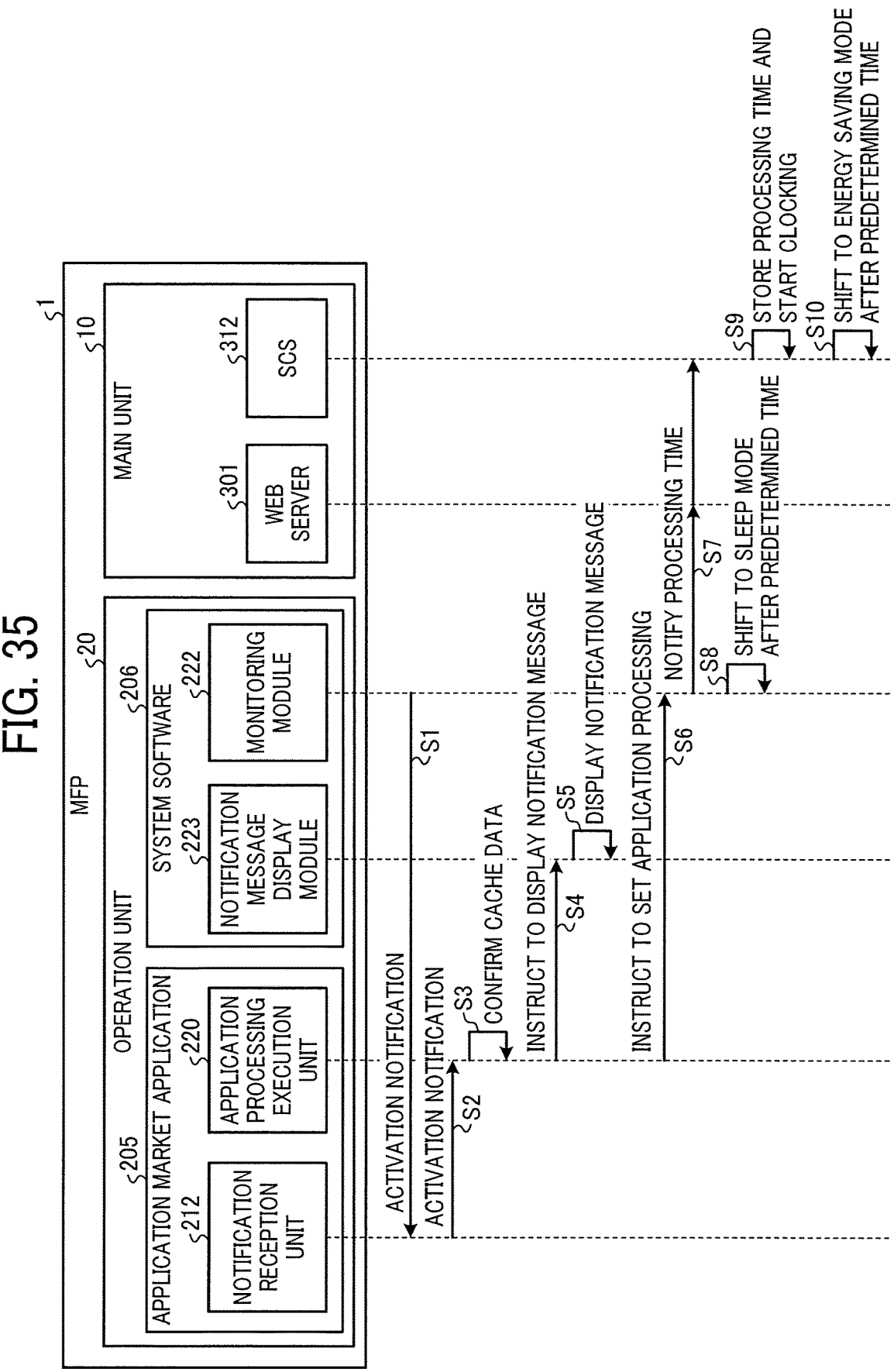
FIG. 35 is a sequence diagram illustrating an example of activation of the MFP.

FIG. 35 is a sequence diagram illustrating an example of activation of the MFP 1 (operation unit 20).

In step S1, when the MFP 1 starts up (when the power supply is turned on), the monitoring module 222 transmits an activation notification indicating that the MFP 1 has been activated to the application market application 205. Here, activation of the MFP 1 includes both the activation of the main unit 10 and the activation of the operation unit 20. Specifically, the monitoring module 222 transmits the activation notification after the power switch of the main unit 10 is turned on, or after the return of the operation unit 20 from the sleep mode is detected. In step S2, the notification reception unit 212 notifies the application processing execution unit 220 of the activation notification, in response to the activation notification from the monitoring module. In step S3, the application processing execution unit 220 checks for cache data. In step S4, when the cache data exists, the application processing execution unit 220 (notification message indication unit 217) instructs the notification message display module 223 to display a notification message. In step S5, in response to the instruction, the notification message display module 223 displays the notification message on the operation panel 27.

In step S6, the application processing execution unit 220 (setting unit 214) instructs the monitoring module 222 to set the automatic application processing. The instruction includes information indicating processing time (processing time set by the user or default processing time as illustrated in FIG. 34) stored in the storage unit of the operation unit 20. In response to this instruction, the monitoring module 222 notifies the main unit 10 of the processing time in step S7. When the operation unit 20 has not received the user's operation for a predetermined period, the monitoring module 222 shifts the state of the operation unit 20 to the sleep mode in step S8. In response to receiving the processing time from the monitoring module 222 through the web server 301, the SCS 312 of the main unit 10 stores the received processing time in the storage unit of the main unit 10 and starts the clock in step S9. When the idle state of the main unit 10 continues for a predetermined period, the SCS 312 shifts the main unit 10 to the energy-saving mode in step S10.

(Setting Procedure of Reservation Processing)

Figure 36:
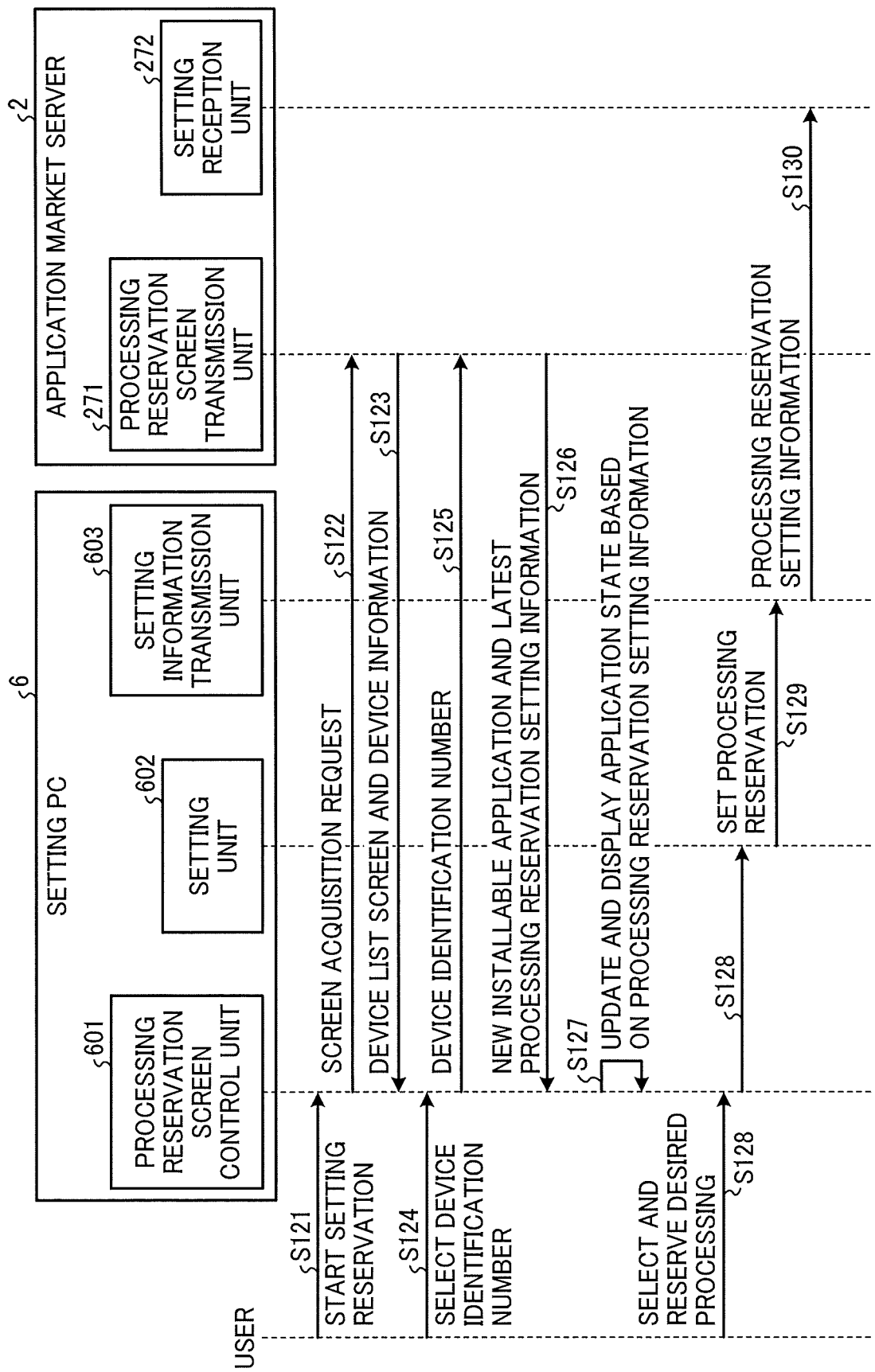
FIG. 36 is a sequence diagram illustrating an example of a reservation setting operation procedure of application processing.

FIG. 36 is a sequence diagram illustrating an example of a reservation setting operation of the application processing in the setting PC 6.

In step S121, the user starts setting reservation of application processing on the screen displayed by the processing reservation screen control unit 601 of the setting PC 6. In step S122, the processing reservation screen control unit 601 transmits a screen acquisition request for displaying the device list screen to the application market server 2. In response to the screen acquisition request, the application market server 2 (processing reservation screen transmission unit 271) transmits the device list screen and the device information of each device to the setting PC 6 in step S123.

The processing reservation screen control unit 601 acquires the device information of each device together with the device list screen from the application market server 2 and displays the device identification number and the model name of each device on the device list screen. In step S124, the user selects the device identification number of the device to set the application processing from the list of displayed devices. In step S125, the processing reservation screen control unit 601 transmits the device identification number of the device selected by the user to the application market server 2.

In step S126, the processing reservation screen control unit 601 acquires information of a new installable application and current processing reservation setting information (latest processing reservation setting information) of the selected device for application processing from the application information of the application market server 2 and displays a supported application list screen. For example, as illustrated in FIG. 33 described above, the processing reservation screen control unit 601 displays "application name", "version", "application state (the current state and settings of the application)", and "processing reservation" on the supported application list screen. In step S127, the processing reservation screen control unit 601 updates the display of the application state based on the installed state (uninstalled, installed) of the application displayed in the list and the current processing reservation setting information. In addition, the processing reservation screen control unit 601 displays the selectable options of processing that can be reserved in the column of "processing reservation" according to the application state displayed on the supported application list screen as described above.

In step S128, the user makes a processing reservation for a desired application (for example, "reserve installation", "cancel installation reservation", "reserve uninstallation", "cancel uninstallation reservation", "cancel update reservation", etc.) on the supported application list screen. In step S129, the setting unit 602 sets the processing reservation selected on the supported application list screen as a processing reservation for the corresponding application. In step S130, the setting information transmission unit 603 transmits the information set by the setting unit 602 as processing reservation setting information to the application market server 2 (setting reception unit 272).

(Automatic Application Processing Operating Procedure)

Figure 37A:
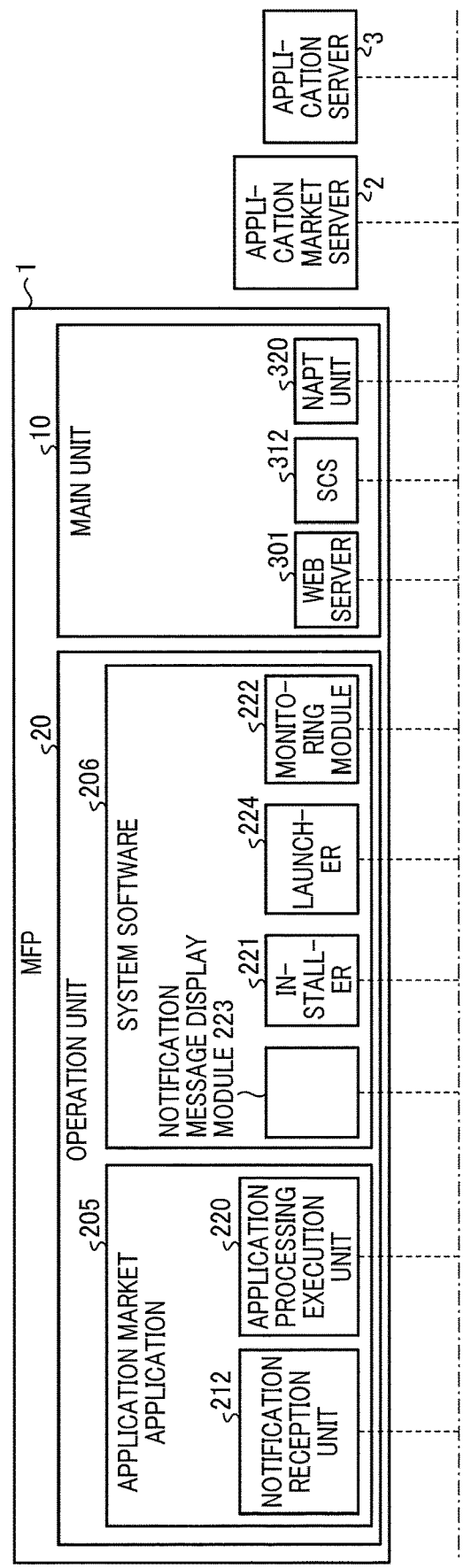
FIG. 37A and FIG. 37B are sequence diagrams illustrating an example of an automatic application processing operating procedure.
Figure 37B:
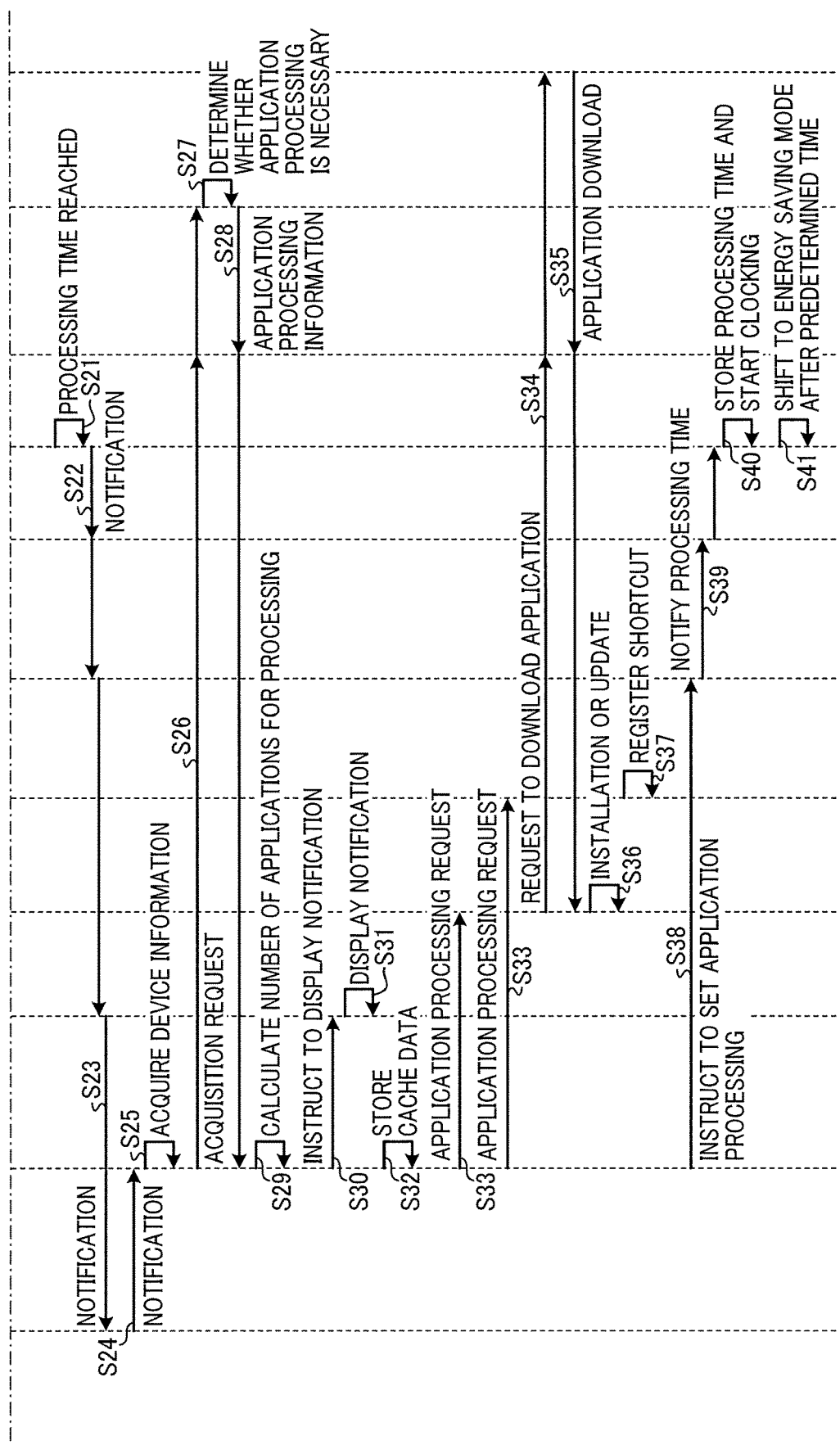

An example of an automatic application processing operating procedure when the processing time has been reached is described with reference to FIG. 37A and FIG. 37B. FIG. 37A and FIG. 37B are sequence diagrams illustrating an example of an automatic application processing operating procedure.

In step S21, when the SCS 312 of the main unit 10 detects that the processing time has been reached, the SCS 312 notifies the monitoring module 222 of the operation unit 20 that the processing time has been reached in step S22. In response to this notification, the monitoring module 222 notifies the notification reception unit 212 that the processing time has been reached in step S23 and the notification reception unit 212 notifies the application processing execution unit 220 that the processing time has been reached in step S24. Upon receiving this notification, the application processing execution unit 220 (device information control unit 218) acquires the product ID, the version, and the application name for identifying the application for each application (including both native application and web application) installed in the MFP 1, together with the device identification number of the MFP 1 as device information in step S25. In step S26, the application processing execution unit 220 (the application processing information acquisition unit 215) transmits the aforementioned acquisition request including the device information to the application market server 2. In this example, the application processing execution unit 220 transmits the acquisition request to the application market server 2 through the NAPT unit 320 of the main unit 10. Upon receiving the acquisition request from the MFP 1, the application market server 2 determines whether or not there is an application requiring application processing in step S27. Although the specific contents are as described above, the following description is continued on the premise that it is determined that there is an application that requires application processing. In response to the acquisition request, the application market server 2 returns the above-described application processing information to the MFP 1 in step S28.

The application processing execution unit 220 (application processing information acquisition unit 215) acquires the application processing information from the application market server 2 through the NAPT unit 320 of the main unit 10. In step S29, based on the application processing information, the application processing execution unit 220 calculates the number of applications that require application processing. In step S30, the application processing execution unit 220 (the notification message indication unit 217) instructs the notification message display module 223 to display a notification informing that there are one or more applications requiring application processing including the number of applications requiring application processing, as illustrated, for example, in FIG. 24. In response to this instruction, the notification message display module 223 displays the notification message on the operation panel 27 in step S31. In step S32, the application processing execution unit 220 stores information indicating the number of applications requiring application processing in the HDD 14 of the main unit 10 as cache data.

In step S33, the application processing execution unit 220 (application processing control unit 216) transmits the aforementioned application processing request for applications that are not prohibited to update among applications that require application processing to the installer 221 and the launcher 224.

In response to the application processing request, the installer 221 executes application processing of the application (native application). In step S34, the installer 221 requests the application server 3 (an example of an external server) through the NAPT unit 320 of the main unit 10 to download an application (native application) installation or updating and in response, the application is downloaded from the application server 3 in step S35. The detailed operation procedure of the firmware update is described below with reference to FIG. 38. In step S36, the installer 221 installs or updates the downloaded application in the MFP 1. In addition, the installer 221 uninstalls the application to be uninstalled indicated by the application processing request.

In response to the application processing request, the launcher 224 performs application processing of the web application. Specifically, when installation is included in the application processing request, in step S37, the launcher 224 registers an icon including a shortcut to the web application server 5 that indicates the download destination of contents and the like relating to the corresponding web application, for example, on the operation screen illustrated in FIG. 8. Further, when processing content indicating update is included in the application processing request, the launcher 224 changes, for example, the download destination of the contents and the like with respect to shortcuts of already registered icons for the corresponding web application. Further, when processing content indicating uninstallation is included in the application processing request, the launcher 224 deletes the icon including the shortcut of the contents and the like concerning the corresponding web application.

In the present embodiment, the operation unit 20 has a function for executing application processing (installation, updating or uninstallation) for one or more installed and uninstalled applications on the operation unit 20. The function includes transmitting processing time, which is the time to perform automatic application processing of the application to the main unit 10 and receiving a notification that the automatic application processing time has reached from the main unit 10. The function includes transmitting processing time, which is the time to perform automatic application processing of the application to the main unit 10 and receiving a notification that the automatic application processing time has reached from the main unit 10. The function also includes downloading the application for automatic application processing from an external server (in this example, the application server 3) through the main unit 10 and installing or updating the application. The function is implemented by an application (in this example, the application market application 205) and at least the above-described application processing information acquisition unit 215, the above-described application processing control unit 216, the installer 221, and the launcher 224. The operation unit 20 includes the application market application 205, the installer 221, and the launcher 224.

As described above, the operation unit 20 and the main unit 10 have different IP addresses, and the main unit 10 has a conversion unit (NAPT unit 320) that converts the IP address of the operation unit 20 into the IP address of the main unit 10. The installer 221 downloads the application installation or updating from the external server through the conversion unit of the main unit 10.

Referring again to FIG. 37A and FIG. 37B, further description is given below. In step S38, the application processing execution unit 220 (setting unit 214) instructs the monitoring module 222 to set automatic application processing. In response to this instruction, the monitoring module 222 notifies the main unit 10 of the processing time in step S39. Upon receiving the processing time from the monitoring module 222 through the web server 301, the SCS 312 of the main unit 10 stores the received processing time in the storage unit of the main unit 10 and starts the clock in step S40. When the idle state of the main unit 10 continues for a predetermined period, the SCS 312 shifts the main unit 10 to the energy-saving mode in step S41.

Figure 38:
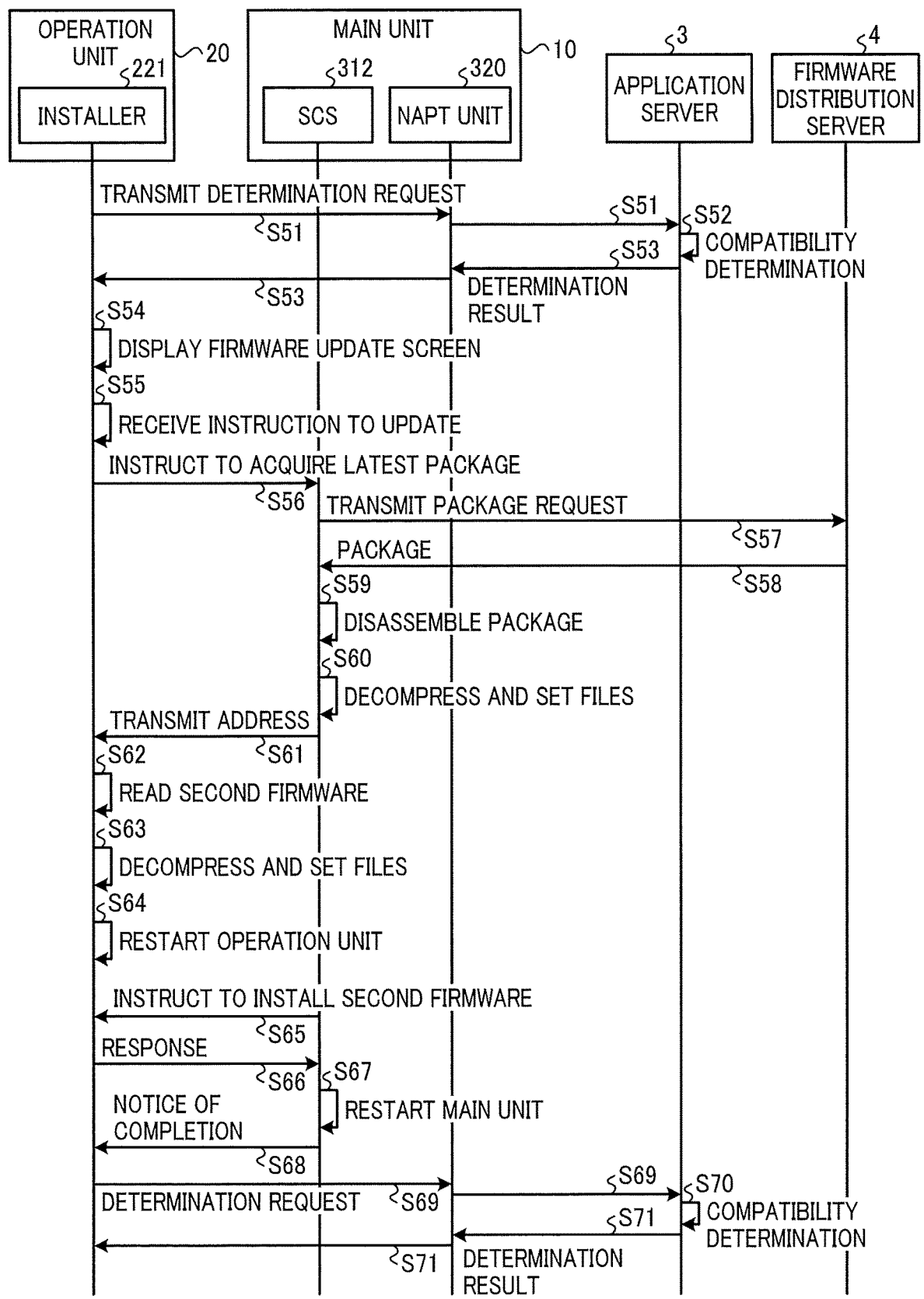
FIG. 38 is a sequence diagram illustrating an example of a firmware update operation.

FIG. 38 is a sequence diagram illustrating an example of a firmware update operation. The operation illustrated in FIG. 38 is an example of the operation procedure of the MFP 1 when the application is installation or updating after step S33 illustrated in FIG. 37B. In step S51, the installer 221 transmits the aforementioned determination request to the application server 3 through the NAPT unit 320 of the main unit 10. In response to the determination request, the application server 3 performs the above-described compatibility determination in step S52 and transmits determination result to the MFP 1 in step S53. The installer 221 receives the determination result through the NAPT unit 320 of the main unit 10.

When the determination result received from the application server 3 indicates that the application identified by the product ID included in the determination request cannot be used in the MFP 1, the installer 221 displays the above-described firmware update screen in step S54. When the determination result received from the application server 3 indicates that the application identified by the product ID included in the determination request can be used in the MFP 1, the processing after step S34 illustrated in FIG. 37B is performed. When the installer 221 receives an instruction to update the firmware through the firmware update screen in step S55, the installer 221 instructs the SCS 312 (the package acquisition unit 251) of the main unit 10 to acquire the latest package in step S56. Upon receiving this instruction, the SCS 312 (package acquisition unit 251) transmits a package request to the firmware distribution server 4 in step S57. In response to the package request, the latest version of the package is acquired from the firmware distribution server 4 and the acquired latest package is stored in the HDD 14 in step S58.

In step S59, the SCS 312 (disassembling unit 252) disassembles the latest version package acquired in step S58 into the second firmware and the third firmware. In step S60, the SCS 312 (the first installation control unit 254) decompresses the files such as programs and data forming the third firmware obtained in the disassembling of step S59 and performs necessary setting. At this stage, the main unit 10 is not restarted.

Next, the SCS 312 instructs the installer 221 to install the second firmware. In step S61, the SCS 312 (the address transmission unit 253) transmits the address data specifying the area in which the second firmware is stored in the HDD 14 to the installer 221, in this example. In step S62, the installer 221 (reading unit 243) reads the second firmware from the area specified by the address data received from the SCS 312 in the HDD 14. In step S63, the installer 221 decompresses files such as programs and data forming the second firmware and performs necessary settings. In step S64, the installer 221 restarts the operation unit 20 after completion of setting files other than the file that cannot be modified while the OS is running and sets files that cannot be modified while the OS is running. As a result, the installation of the second firmware to the operation unit 20 is completed.

After the restart of the operation unit 20 is completed and the operation unit 20 and the main unit 10 are reconnected, the SCS 312 of the main unit 10 instructs the installer 221 to install the second firmware again in step S65. At this stage, since installation of the second firmware to the operation unit 20 has been completed, the installer 221 in response to this instruction instantly transmits a response indicating that the installation of the second firmware has been completed to the SCS 312 in step S66. In response, the SCS 312 (the first installation control unit 254) restarts the main unit 10 and sets a file that cannot be modified while the OS is running in step S67. As a result, the installation of the third firmware to the main unit 10 is also completed.

Upon completion of the process of step S67, the SCS 312 notifies the installer 221 that the installation of the third firmware to the main unit 10 is completed in step S68. Upon receiving this notification, the installer 221 again requests the application server 3 for the compatibility determination. More specifically, the installer 221 reacquires module information from the system module of the main unit 10 and transmits a determination request including the reacquired module information and a product ID (a product ID included in the application processing request) for identifying an application that requires installation or updating to the application server 3 through the NAPT unit 320 of the main unit 10 in step S69. In the same manner as described above, the application server 3 that has received the determination request performs the above-described compatibility determination in step S70 and transmits determination result to the MFP 1 in step S71. The installer 221 receives the determination result through the NAPT unit 320 of the main unit 10.

In this way, it is assumed that the update of the firmware is executed before the application is installed or updated. As a result, when updating a plurality of applications and if an update fails after a successful update, it is possible to prevent occurrence of troubles such as inability to start a successfully updated application. Note that the updating of the firmware is not limited to being executed before installation or update of the application, and the order may be reversed. Although the firmware is automatically updated as illustrated in FIG. 38, the present disclosure is not limited to this procedure and the firmware may be manually updated by an administrator or the like.

Figure 39:
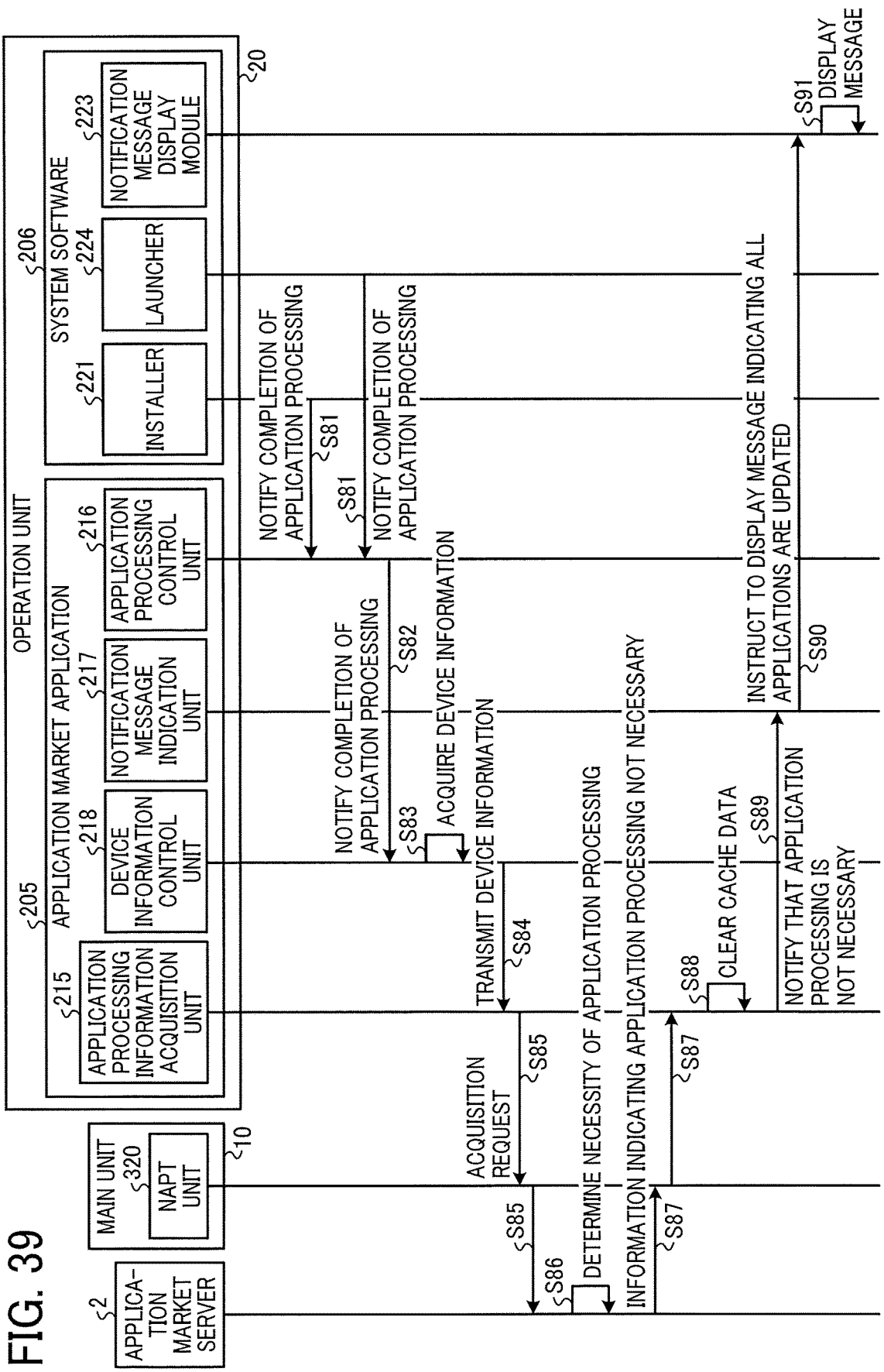
FIG. 39 is a sequence diagram illustrating an example of an operation procedure after application processing is completed.
Figure 40:
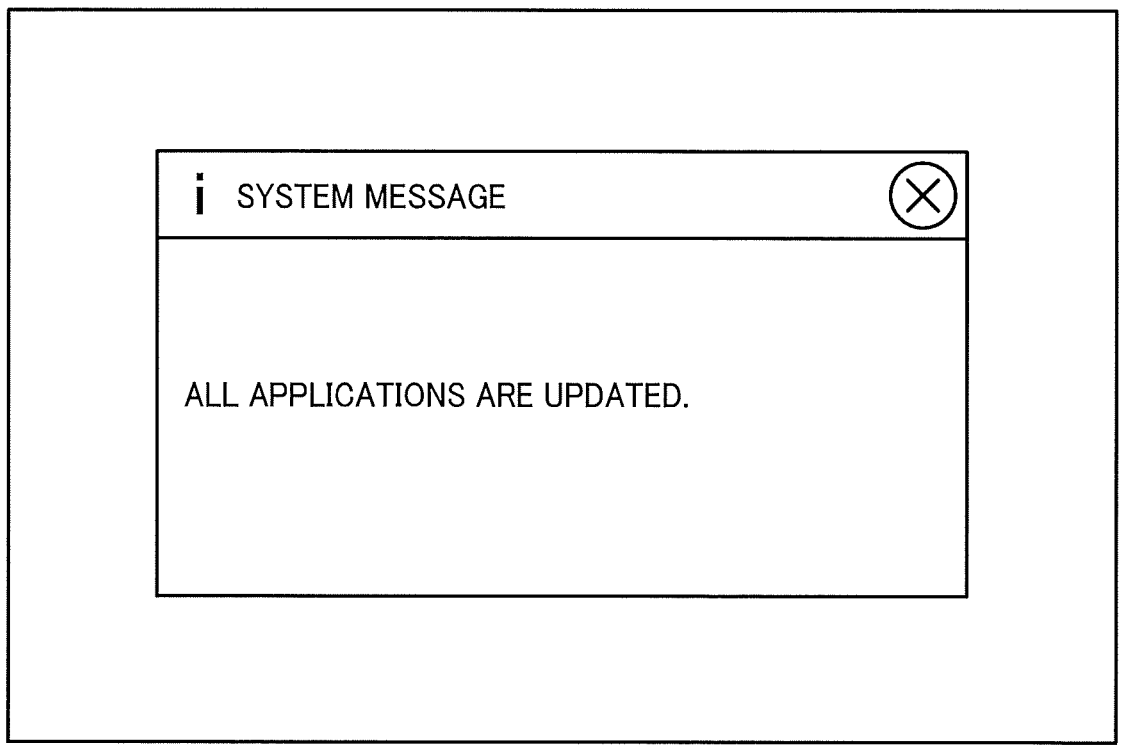
FIG. 40 is a diagram illustrating an example of a notification message.

An example of the operation procedure of the MFP 1 after completion of the application process is described with reference to FIGS. 39 and 40. FIG. 39 is a sequence diagram illustrating an example of an operation procedure after the automatic application processing is completed. FIG. 40 is a diagram illustrating an example of a notification message.

When the application processing of the application requiring application processing (the application identified by the product ID included in the above-described application processing request) is completed, the installer 221 and the launcher 224 respectively notify the application processing control unit 216 of the completion of processing to in step S81. In response to a processing completion notification, the application processing control unit 216 notifies the device information control unit 218 that the application processing has been completed in step S82. In response to the notification, the device information control unit 218 acquires for each application (including both the native application and the web application) installed in the MFP 1, together with the product identification number of the MFP 1, the product ID identifying the application, the version, and the application name as device information in step S83. In step S84, the device information control unit 218 transmits the acquired device information to the application processing information acquisition unit 215. In response to the device information, the application processing information acquisition unit 215 transmits an acquisition request including the device information to the application market server 2 through the NAPT unit 320 of the main unit 10 in step S85. In response to the acquisition request from the MFP 1, the application market server 2 determines whether or not there is an application requiring application processing in step S86. As a result, the device information of the device (the MFP 1) managed by the application market server 2 is updated to the latest information. Although the specific contents are as described above, the description is continued on the premise that it is determined that there is no application that requires application processing. In response to the acquisition request, the application market server 2 returns the information indicating that application processing is unnecessary to the MFP 1 in step S87. The application processing information acquisition unit 215 receives the information indicating that application processing is unnecessary from the application market server 2 through the NAPT unit 320 of the main unit 10.

When acquiring the information indicating that application processing is unnecessary from the application market server 2, the application processing information acquisition unit 215 clears (erases) the cache data stored in the HDD 14 of the main unit 10 in step S88. In step S89, the application processing information acquisition unit 215 notifies the notification message indication unit 217 that there is no application that requires application processing. In response to this notification, the notification message indication unit 217 instructs the notification message display module 223 to display a notification message indicating that all the applications are up to date in step S90. In response to this instruction, the notification message display module 223 displays, for example, a notification message as illustrated in FIG. 40 on the operation panel 27 in step S91. If for some reason all of the application processing indicated by the application processing information illustrated in FIG. 37 cannot be completed (for example, when the application could not be downloaded due to a failure of the network 8, etc.) a notification message indicating a failure of the application processing may be displayed on the operation panel 27. Also, at the time of steps S90 and S91, the notification message displayed at step S30 illustrated in FIG. 37 may be deleted to indicate that the application processing is successfully completed, and all applications are up to date.

As described above, the MFP 1 according to the present embodiment acquires application processing information indicating an application that requires application processing (that is, installation, update, and uninstallation) among one or more installed and uninstalled applications from the application market server 2 and controls the application processing with respect to the application indicated by the acquired application processing information. According to the present embodiment, in automatic application processing of an application, by setting reservation of application processing on the MFP 1 in advance by an external device (for example, setting PC 6), the user does not have to determine the presence or absence of an application requiring application processing and operate the processing on the MFP 1 side since the MFP 1 only requires to acquire information (application processing information) indicating an application that requires application processing from the application market server 2, and processing becomes efficient. That is, according to the present embodiment, it is possible to automatically and efficiently perform the processing related to the application with respect to the MFP 1.

Further, an example in which a firewall is installed on a network for connection between the MFP 1 and the application market server 2 in order to block external access to a local area network (LAN) or the like including the MFP 1 is described below. In this case, in the push-type processing of accessing the MFP 1 from the application market server 2 and executing application processing such as installation and update, the above-described firewall becomes a barrier and the efficiency of processing deteriorates. However, according to the present embodiment, when the processing time is reached, the MFP 1 executes a pull-type process of voluntarily transmitting the acquisition request to the application market server 2 to acquire the application processing information. As a result, it is possible to achieve automatic installing, updating and uninstalling applications while blocking unauthorized external access using the firewall.

Although the operation unit 20 having a CPU and an OS independent of the main unit 10 is mounted on the main unit 10, the entity is another device that is independently controlled. Because of this configuration, there was a problem that the operation unit 20 did not have a mechanism to communicate with an external server device through the main unit 10, which has a network interface. The operation unit 20 communicates with an external server device such as the application market server 2 or the like using the network interface (for example, the communication I/F 15) included in the main unit 10 by using the address conversion by the NAPT unit 320 on the main unit 10, and acquires information on application processing, displays a list, and downloads the application installation or updating in the operation unit 20. Since the main unit 10 and the operation unit 20 have separate IP addresses, the image forming apparatus (the MFP 1) has two IP addresses. However, with the address conversion by the NAPT unit 320, the MFP 1 can be identified as a single device as seen from the external server device even when operation unit 20 is communicating through the main unit 10 and the server.

In the above description, it is assumed that the target of the application processing is the MFP 1, but the present disclosure is not limited to this description and can be applied to general electronic device that can install, update, or uninstall (application processing) the application.

Second Embodiment

Next, a second embodiment is described. Note that descriptions of parts common to the above-described first embodiment are omitted as appropriate. As described above, when the state in which the operation unit 20 has not accepted the operation by the user continues for a predetermined period of time, a first energy-saving control unit (a monitoring module 222) included in the operation unit 20 causes the state of the operation unit 20 to shift to an operation unit energy-saving state in which the power consumption is lower than that of the normal operation and when the idle state in which the main unit 10 does not execute image processing continues for a predetermined period of time, a second energy-saving control unit (SCS 312) causes the state of the main unit 10 to shift to the main unit energy-saving state in which the power consumption is lower than the main unit normal state in which the main unit 10 can normally operate. In the present embodiment, when the operation unit 20 is in the operation unit energy-saving state, the main unit 10 is in the main unit energy-saving state, and when the processing time (processing time) is reached, the monitoring module 222 of the operation unit 20 (first energy-saving control section) returns the operation unit 20 to the normal state, while the SCS 312 (the second energy-saving control unit) of the main unit 10 maintains the main unit 10 in the main unit energy-saving state. As described above, the main unit energy-saving state (energy-saving mode) can be a state in which only timekeeping and communication with the network 8 are operable, but the present disclosure is not limited thereto.

As with the first embodiment described above, when the processing time is reached, the SCS 312 notifies the monitoring module 222. At this time, the SCS 312 maintains the main unit 10 in the main unit energy-saving state. In response to the notification from the SCS 312, the monitoring module 222 returns the operation unit 20 to the normal state and notifies the application market application 205 (the notification reception unit 212) that the processing time has been reached. The subsequent operation is the same as in the above-described first embodiment. According to the present embodiment, the power consumption of the MFP 1 can be further reduced.

In each of the embodiments described above, the SCS 312 of the main unit 10 has a function of detecting whether or not the processing time has been reached, but the present disclosure is not limited to this operation, and for example, the monitoring module 222 of the operation unit 20 may have a function of detecting whether or not the processing time has been reached (a function of storing and time the processing time). In this embodiment, when the monitoring module 222 detects that the processing time has been reached, the monitoring module 222 notifies the application market application. The subsequent operation is the same as in the above-described first embodiment. Note that the main unit 10 may be notified or not notified. The SCS 312 of the main unit 10 maintains the main unit 10 in the main unit energy-saving state even when receiving the notification that the processing time has been reached from the monitoring module 222 of the operation unit 20 in the main unit energy-saving state described above.

Although the embodiments according to the present disclosure are described above, the present disclosure is not limited to the embodiments described above, and at the implementation stage, elements can be modified and embodied within the scope not deviating from the gist thereof. Further, various embodiments can be formed by appropriately combining a plurality of elements disclosed in each of the above embodiments. For example, some elements may be deleted from all the elements illustrated in each embodiment. Further, the elements of each embodiment may be appropriately combined.

In the above-described embodiments, the main unit 10 and the operation unit 20 operate independently from each other by separate operating systems, but the present disclosure is not limited to this configuration. For example, the main unit 10 and the operation unit 20 may operate with the same operating system. Further, for example, one server may be provided in which the above-described application market server 2 and the application server 3 are integrated.

Further, the programs executed by the information processing system 100 (the MFP 1, the application market server 2, the application server 3, the firmware distribution server 4, the web application server 5, the setting PC 6, etc.) according to the embodiments described above can be installed in an installable format such as a computer-readable recording medium (CD-ROM), a flexible disk (FD), a Compact Disc Read Only Memory (CD-R), a Digital Versatile Disk (DVD), a Universal Serial Bus (USB), or may be provided or distributed through a network such as the internet. Furthermore, various kinds of programs according to the above-described embodiments may be provided as being preloaded in a ROM and the like.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An image forming apparatus communicably connected to a server, the image forming apparatus, comprising:
   circuitry configured to
      acquire application processing information reserved in the server in advance, the application processing information indicating at least one application from among one or more applications that are installed or not installed on the image forming apparatus, which is determined to require application processing; and control the application processing of the application indicated by the application processing information acquired from the server, wherein the circuitry is further configured to send an acquisition request for the application processing information to the server and acquire the application processing information from the server as a response to the acquisition request, when a processing time, which is a time for executing the application processing, is reached; and wherein the circuitry is further configured to set the processing time based on a predetermined processing time zone, monitor whether the processing time is reached, and send the acquisition request to the server when the processing time is reached.

2. The image forming apparatus of claim 1, wherein the circuitry is further configured to select the processing time randomly within the predetermined processing time zone.

3. The image forming apparatus of claim 1, wherein the application processing information acquired by the circuitry indicates that the at least one application is determined to require execution of at least one of installation, update, and uninstallation of the application.

4. The image forming apparatus of claim 1, wherein the circuitry is further configured to display a notification message on a display when the application processing information acquired from the server indicates that there is an application that requires the application processing.

5. The image forming apparatus of claim 1, wherein the circuitry is further configured to:
control an operation unit of the image forming apparatus to acquire the application processing information and to execute the application processing; and
control a main unit of the image forming apparatus to form an image on a recording medium.

6. The image forming apparatus of claim 5, wherein the circuitry is further configured to:
shift a state of the operation unit to a first energy-saving state in which power consumption is smaller than a state in which the operation unit can operate normally, when the operation unit has not accepted the operation for a predetermined period;
shift a state of the main unit to a second energy-saving state in which power consumption is smaller than a state in which the main unit can operate normally, when an idle state in which the main unit does not execute image processing continues for a predetermined period; and
return a state of the operation unit to a normal state and maintain the main unit in the second energy-saving state, when the operation unit is in the first energy-saving state, the main unit is in the second energy-saving state, and the processing time to execute the application processing is reached.

7. The image forming apparatus of claim 1, wherein the circuitry is further configured to update firmware when it is required to update the firmware to use the application indicated by the application processing information.

8. An information processing system, comprising:
a server; and
an image forming apparatus connected to the server through a network;
the image forming apparatus including first circuitry configured to
acquire application processing information reserved in the server in advance, the application processing information indicating at least one application from among one or more applications that are installed or not installed on the image forming apparatus, which is determined to require application processing; and
control the application processing of the application indicated by the application processing information acquired from the server,
wherein the first circuitry is further configured to send an acquisition request for the application processing information to the server and acquire the application processing information from the server as a response to the acquisition request, when a processing time, which is a time for executing the application processing, is reached; and
wherein the first circuitry is further configured to set the processing time based on a predetermined processing time zone, monitor whether the processing time is reached, and send the acquisition request to the server when the processing time is reached; and
the server including second circuitry configured to
determine whether an application that requires the application processing exists when an acquisition request for application processing information is received from the image forming apparatus; and
transmit the application processing information to the image forming apparatus as a response to the acquisition request when it is determined that an application requiring the application processing exists.

9. An information processing method, comprising:
acquiring application processing information reserved in a server in advance, the application processing information indicating at least one application from among one or more applications that are installed or not installed on an image forming apparatus, which is determined to require application processing; and
controlling the application processing of the application indicated by the application processing information acquired from the server,
wherein the method further comprises sending an acquisition request for the application processing information to the server and acquiring the application processing information from the server as a response to the acquisition request, when a processing time, which is a time for executing the application processing, is reached; and
wherein the method further comprises setting the processing time based on a predetermined processing time zone, monitoring whether the processing time is reached, and sending the acquisition request to the server when the processing time is reached.

* * * * *